United States Patent
Padilla

(10) Patent No.: US 11,435,814 B2
(45) Date of Patent: Sep. 6, 2022

(54) SYSTEM AND METHOD FOR IDENTIFYING RESOURCES OF A COMPOSED SYSTEM

(71) Applicant: Dell Products L.P., Hopkinton, MA (US)

(72) Inventor: Valerie Diane Padilla, Austin, TX (US)

(73) Assignee: Dell Produts L.P., Hopkinton, MA (US)

( * ) Notice: Subject to any disclaimer, the term of this patent is extended or adjusted under 35 U.S.C. 154(b) by 0 days.

(21) Appl. No.: 17/116,870

(22) Filed: Dec. 9, 2020

(65) Prior Publication Data
US 2022/0179474 A1 Jun. 9, 2022

(51) Int. Cl.
| | |
|---|---|
| G06F 1/32 | (2019.01) |
| G06F 1/329 | (2019.01) |
| G06F 1/20 | (2006.01) |
| G06F 1/24 | (2006.01) |
| G06F 1/28 | (2006.01) |

(52) U.S. Cl.
CPC ............ *G06F 1/329* (2013.01); *G06F 1/20* (2013.01); *G06F 1/24* (2013.01); *G06F 1/28* (2013.01)

(58) Field of Classification Search
CPC ... G06F 1/329; G06F 1/20; G06F 1/24; G06F 1/28
See application file for complete search history.

(56) References Cited

U.S. PATENT DOCUMENTS

| | | |
|---|---|---|
| 7,620,984 B2 | 11/2009 | Kallahalla |
| 8,306,948 B2 | 11/2012 | Chou |
| 8,589,659 B1 | 11/2013 | Shapiro |
| 8,997,242 B2 | 3/2015 | Chen |
| 9,104,844 B2 | 8/2015 | Fang |
| 9,105,178 B2 | 8/2015 | Carlson |
| 9,245,096 B2 | 1/2016 | Abuelsaad |
| 9,569,598 B2 | 2/2017 | Abuelsaad |

(Continued)

OTHER PUBLICATIONS

Anonymous: "Dell Chassis Management Controller Version 6.20 for PowerEdge M1000e" Dec. 3, 2018 (Dec. 3, 2018) 274 pages, Retrieved from the Internet: URL:https://dl/del/com/topicspdf/dell-chassis-management-controller-v620-poweredge-m1000e_users-guide_en-us.pdf.

(Continued)

*Primary Examiner* — Zahid Choudhury
(74) *Attorney, Agent, or Firm* — Chamberlain, Hrdlicka, White, Williams & Aughtry

(57) ABSTRACT

An information handling system for composing composed information handling systems includes managed devices and a system control processor, of a composed information handling system of the composed information handling systems. The system control processor, during a restart of the composed information handling system: obtains an inventory of all hardware devices utilized by the composed information handling system, calculates, based on a subset of the hardware devices specified by the inventory, a power envelope for the information handling system, makes a determination that the power envelope does not exceed a power capacity of the managed devices; and, based on the determination and following the restart, provides computer implemented services using the hardware devices while operating the managed devices based on the power envelope.

19 Claims, 10 Drawing Sheets

(56) References Cited

U.S. PATENT DOCUMENTS

| | | |
|---|---|---|
| 9,613,147 B2 | 4/2017 | Carlson |
| 9,678,977 B1 | 6/2017 | Aronovich |
| 9,959,140 B2 | 5/2018 | Jackson |
| 10,348,574 B2 | 7/2019 | Kulkarni |
| 10,382,279 B2 | 8/2019 | Roese |
| 10,601,903 B2 | 3/2020 | Bivens |
| 10,628,225 B2 | 4/2020 | Yamato |
| 10,782,882 B1 | 9/2020 | Wu |
| 10,909,283 B1* | 2/2021 | Wang .................... G06F 30/331 |
| 2004/0257998 A1* | 12/2004 | Chu .................... H04L 41/00 370/252 |
| 2006/0082222 A1* | 4/2006 | Pincu .................... G06F 1/3203 307/29 |
| 2008/0313476 A1* | 12/2008 | Hansen .................... G06F 1/3203 713/300 |
| 2011/0154500 A1 | 6/2011 | Sahita et al. |
| 2012/0047328 A1 | 2/2012 | Williams et al. |
| 2013/0346718 A1 | 12/2013 | Meshchaninov et al. |
| 2014/0165063 A1 | 6/2014 | Shiva et al. |
| 2015/0317173 A1 | 11/2015 | Anglin |
| 2016/0062441 A1* | 3/2016 | Chou .................... G06F 1/3287 713/320 |
| 2016/0180087 A1 | 6/2016 | Edwards et al. |
| 2016/0259665 A1 | 9/2016 | Gaurav et al. |
| 2017/0118247 A1 | 4/2017 | Hussain |
| 2018/0024964 A1 | 1/2018 | Mao |
| 2019/0065256 A1 | 2/2019 | Hamilton et al. |
| 2019/0227616 A1* | 7/2019 | Jenne .................... G06F 9/4406 |
| 2019/0356729 A1 | 11/2019 | Bivens et al. |
| 2019/0384516 A1 | 12/2019 | Bernat |
| 2020/0174949 A1 | 6/2020 | Ramasamy et al. |
| 2020/0218561 A1 | 7/2020 | Lal et al. |
| 2021/0037466 A1* | 2/2021 | Silva .................... G06F 1/3225 |
| 2021/0117441 A1 | 4/2021 | Patel et al. |

OTHER PUBLICATIONS

International Searching Authority, International Search Report and Written Opinion dated Oct. 21, 2021 for corresponding PCT Application No. PCTUS2021029708 filed Apr. 28, 2021.

International Searching Authority, International Search Report and Written Opinion for corresponding PCT Application No. PCTUS2021029702 filed Apr. 28, 2021, dated Aug. 19, 2021, 13 pages.

International Searching Authority, International Search Report and Written Opinion dated Jul. 19, 2021, issued in corresponding PCT Application No. PCT/US2021/029687, 11 pages.

International Searching Authority, International Search Report and Written Opinion of corresponding PCT Application No. PCT/US2021/029698, dated Aug. 9, 2021, 15 pages.

* cited by examiner

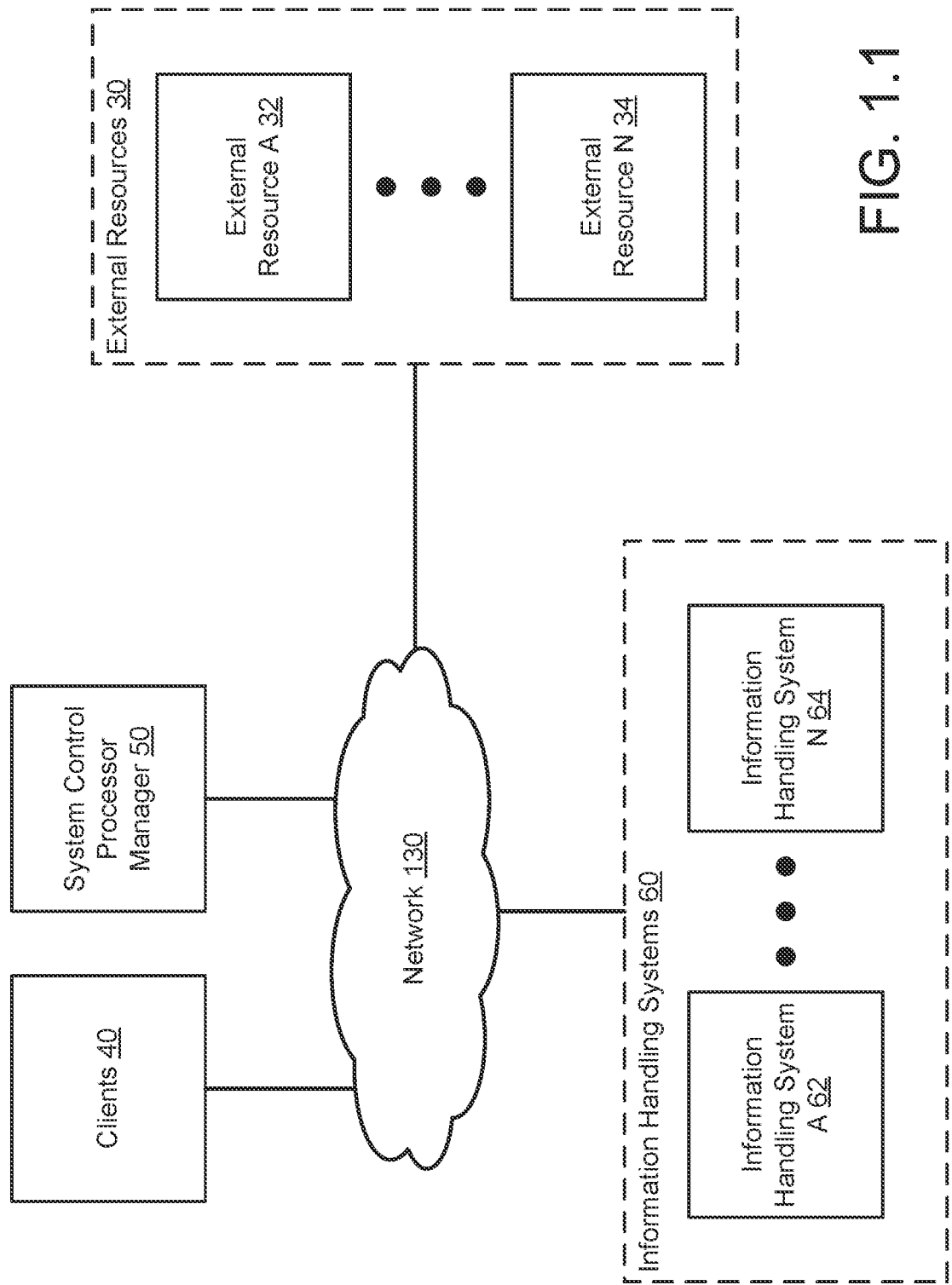
FIG. 1.1

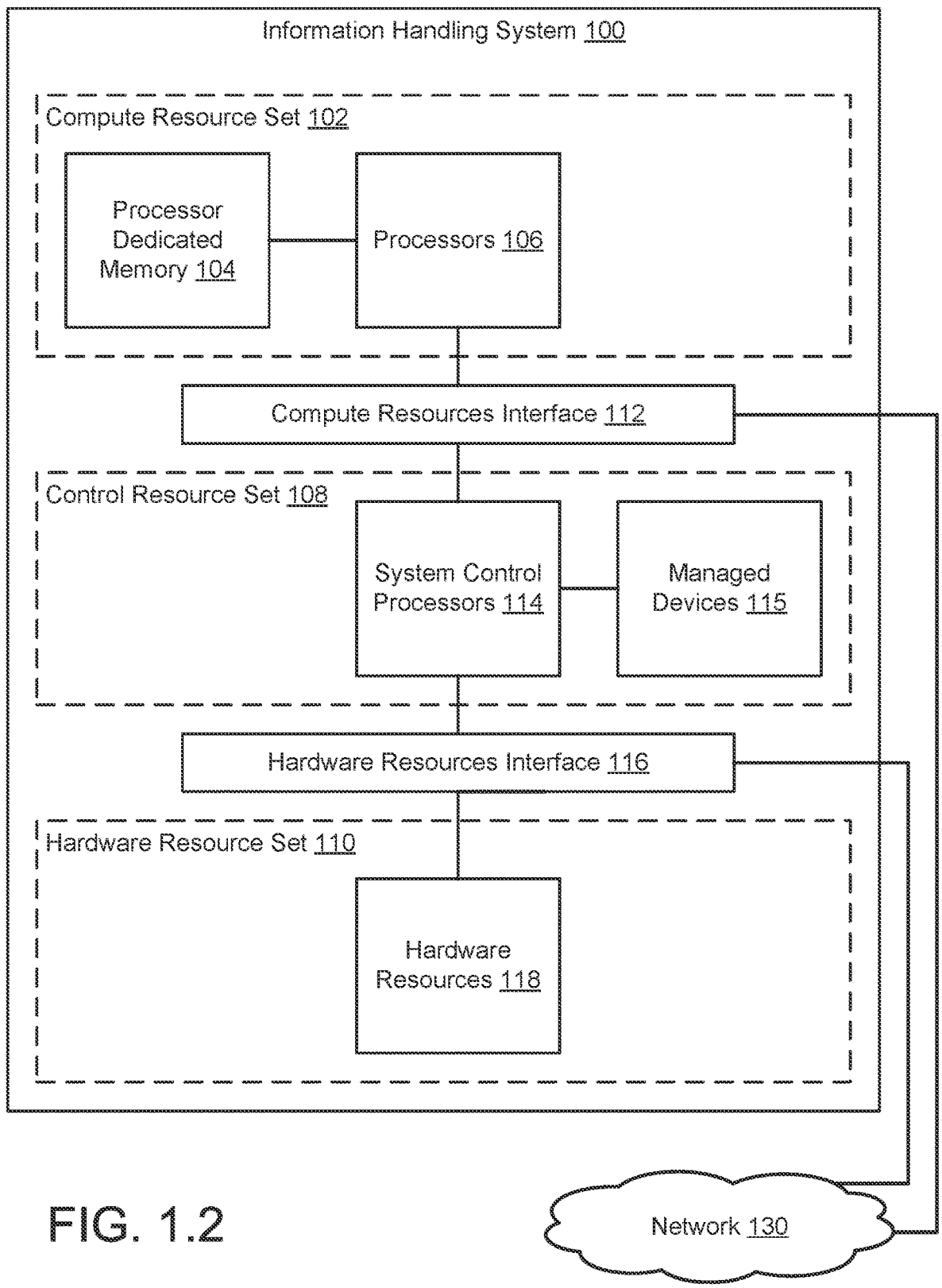
FIG. 1.2

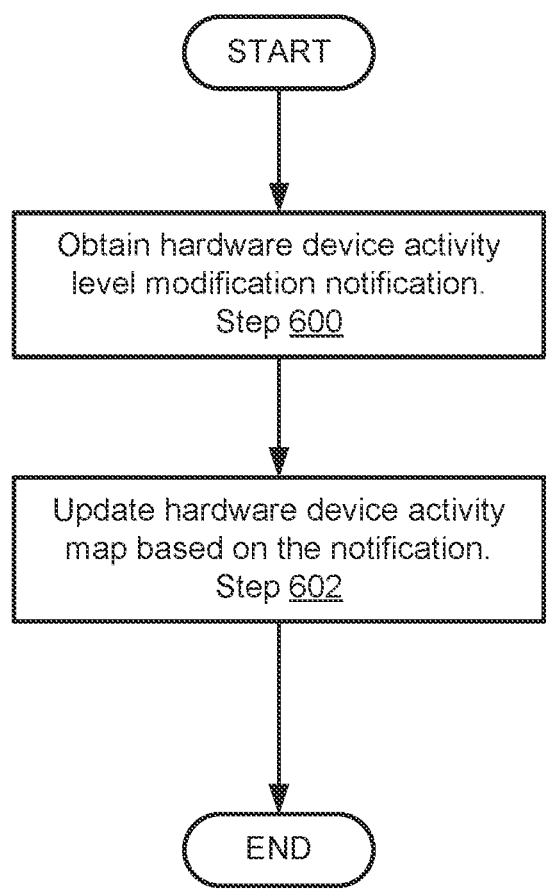
FIG. 6.1

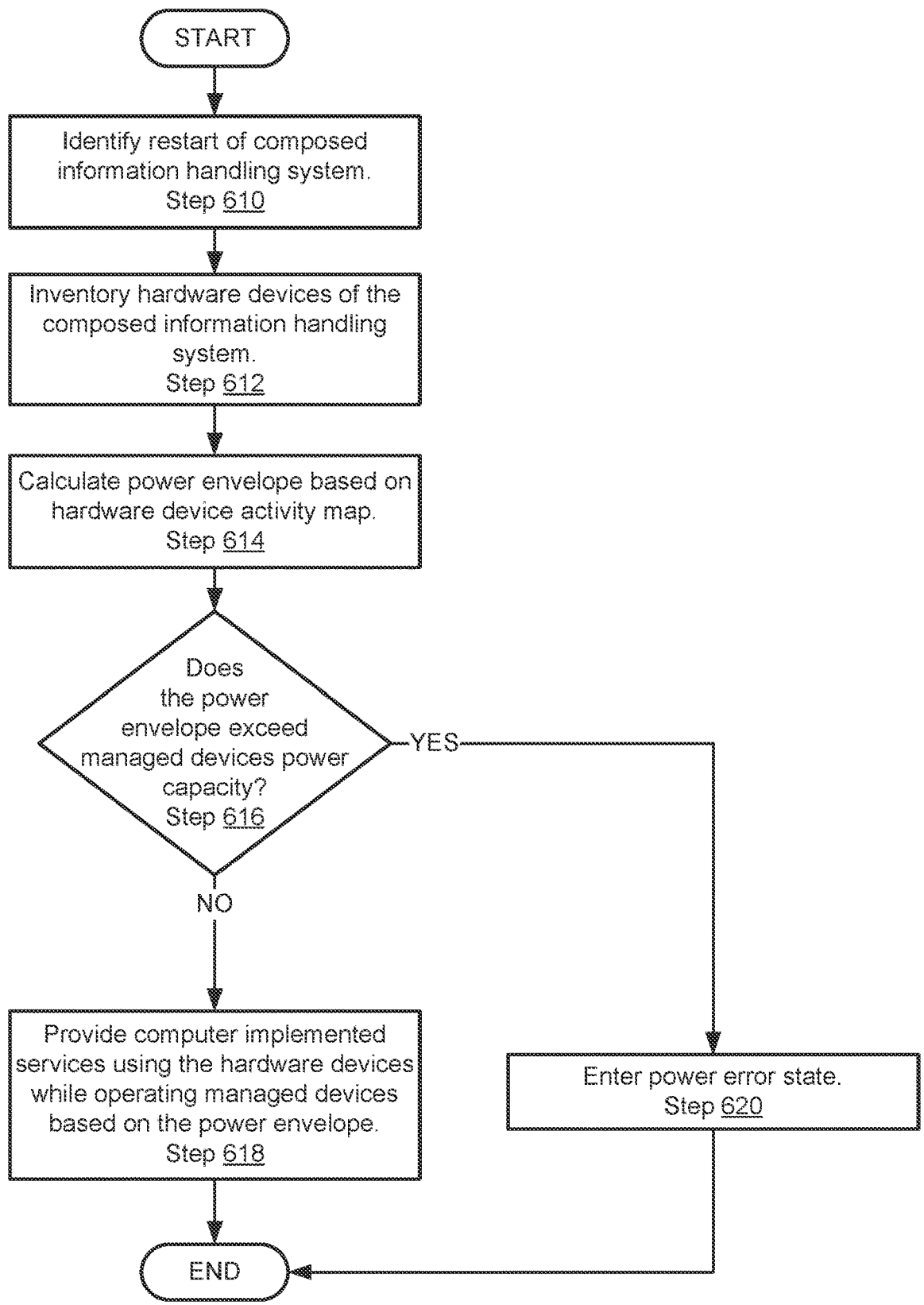
FIG. 6.2

SYSTEM AND METHOD FOR IDENTIFYING RESOURCES OF A COMPOSED SYSTEM

BACKGROUND

Computing devices may provide services. To provide the services, the computing devices may include hardware components and software components. The services provided by the computing devices may be limited by these components.

SUMMARY

In one aspect, an information handling system for composing composed information handling systems in accordance with one or more embodiments of the invention includes managed devices and a system control processor, of a composed information handling system of the composed information handling systems. The system control processor, during a restart of the composed information handling system: obtains an inventory of all hardware devices utilized by the composed information handling system, calculates, based on a subset of the hardware devices specified by the inventory, a power envelope for the information handling system, makes a determination that the power envelope does not exceed a power capacity of the managed devices; and, based on the determination and following the restart, provides computer implemented services using the hardware devices while operating the managed devices based on the power envelope.

In one aspect, a method for providing computer implemented services using composed information handling systems in accordance with one or more embodiments of the invention includes, during a restart of a composed information handling system of the composed information handling systems: obtaining an inventory of all hardware devices of an information handling system that are utilized by the composed information handling system, calculating, based on a subset of the hardware devices specified by the inventory, a power envelope for the information handling system, making a determination that the power envelope does not exceed a power capacity of managed devices that provide power management services for the information handling system; and, based on the determination and following the restart, providing computer implemented services using the hardware devices while operating devices that provide power management services to the subset of the hardware devices based on the power envelope.

In one aspect, a non-transitory computer readable medium in accordance with one or more embodiments of the invention includes computer readable program code, which when executed by a computer processor enables the computer processor to perform a method for providing computer implemented services using composed information handling systems. The method includes, during a restart of a composed information handling system of the composed information handling systems: obtaining an inventory of all hardware devices of an information handling system that are utilized by the composed information handling system, calculating, based on a subset of the hardware devices specified by the inventory, a power envelope for the information handling system, making a determination that the power envelope does not exceed a power capacity of managed devices that provide power management services for the information handling system; and, based on the determination and following the restart, providing computer implemented services using the hardware devices while operating devices that provide power management services to the subset of the hardware devices based on the power envelope.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention.

FIG. 1.2 shows a diagram of an information handling system in accordance with one or more embodiments of the invention.

FIG. 6.1 shows a flowchart of a method of maintaining a hardware device activity map in accordance with one or more embodiments of the invention.

FIG. 6.2 shows a flowchart of a method of restarting a composed information handling system to provide computer implemented services in accordance with one or more embodiments of the invention.

DETAILED DESCRIPTION

Figure 2:
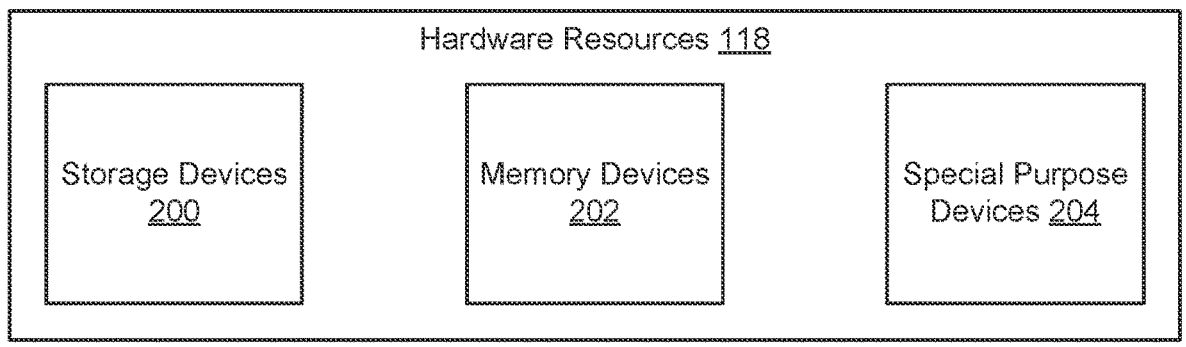
FIG. 2 shows a diagram of hardware resources in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to systems, devices, and methods for providing computer implemented services. To provide computer implemented services, computing resources may need to be allocated for the performance of the services. The computing resources may include, for example, processing resources, memory, resources, storage resources, etc. Various types of hardware devices may consume power and generate heat to provide the computing resources.

To allocate the computing resources, composed information handling systems may be instantiated. A composed information handling system may be a device (the components of which may be distributed across one or more information handling systems) that has exclusive use over a quantity of computing resources. Computing resources from multiple information handling systems may be allocated to a composed information handling system thereby enabling a composed information handling system to utilize computing resources from any number of information handling system for performance of corresponding computer implemented services. However, because hardware devices from multiple information handling systems may be allocated to a single composed information handling system, the power envelope of the composed information handling system may be different from the power envelopes of the information handling systems that provide hardware devices to the composed system.

To improve the accuracy of power envelope calculations, a system in accordance with embodiments of the invention may maintain, on a per information handling system basis, an activity map of hardware devices of the information handling system. The activity may specify, for each hardware device, an activity level of the hardware device. When calculating a power envelope, the information included in the activity map may be used (as opposed to the activity levels of hardware devices allocated to a composed information handling system).

To maintain the activity map, a system control processor manager of the system that manages the process of instantiating and recomposing composed information handling systems may notify each information handling system when it is impacted by an instantiation or composition of a composed information handling system. Specifically, the system control processor may notify each information handling system of changes in the activity levels of its hardware devices based on the instantiation and/or recomposition. Consequently, each information handling system may maintain an up to date activity map for only its own hardware devices.

By maintaining the activity map, the power envelope calculations may be more likely to accurately represent the operation of an information handling system. Consequently, any activities that utilize the power envelope may also be rendered more accurate. For example, an information handling system may set the operating points of fans, power supplies, and/or other types of components (e.g., managed devices) based on the power envelope. Accordingly, the resulting operation of these devices may be better matched to the activity of the information handling system thereby reducing wasteful overprovisioning of the operation of these devices and avoiding misidentification of potential failure states of the information handling system.

FIG. 1.1 shows a system in accordance with one or more embodiments of the invention. The system may include any number of information handling systems (60). The information handling systems (60) may provide computer implemented services. The computer implemented services may include, for example, database services, data storage services, electronic communications services, data protection services, and/or other types of services that may be implemented using information handling systems.

The information handling systems of FIG. 1.1 may operate independently and/or cooperatively to provide the computer implemented services. For example, a single information handling system (e.g., 62) may provide a computer implemented service on its own (i.e., independently) while multiple other information handling systems (e.g., 62, 64) may provide a second computer implemented service cooperatively (e.g., each of the multiple other information handling systems may provide similar and or different services that form the cooperatively provided service).

To provide computer implemented services, the information handling systems (60) may utilize computing resources provided by hardware devices. The computing resources may include, for example, processing resources, storage resources, memory resources, graphics processing resources, communications resources, and/or other types of resources provided by the hardware devices. Various hardware devices may provide these computing resources. To provide the aforementioned resources, the hardware devices may consume electrical power thereby generating heat.

The type and quantity of computing resources required to provide computer implemented services may vary depending on the type and quantity of computer implemented services to be provided. For example, some types of computer implemented services may be more compute intensive (e.g., modeling) while other computer implemented services may be more storage intensive (e.g., database) thereby having different computing resource requirements for these different services.

Clients (40) may request that the computer implemented services be provided. For example, the clients (40) may send requests to management entities to have the computer implemented services be provided.

In general, embodiments of the invention relate to systems, methods, and devices for managing the hardware resources of the information handling systems (60) and/or other resources (e.g., external resources (30)) to provide computer implemented services. The hardware resources of the information handling systems (60) may be managed by instantiating one or more composed information handling systems using the computing resources of the information handling systems (60), external resources (30), and/or other types of hardware devices operably connected to the information handling systems (60). Consequently, the computing resources allocated to a composed information handling system may be tailored to the specific needs of the services that will be provided by the composed information handling system.

When operating, the various hardware devices of the composed information handling systems may consume power and generate heat. However, because a composed system may include hardware devices from different devices, it may not be possible to estimate the power consumption, necessary cooling requirements, and/or other management activities for the hardware devices of an information handling system based on the hardware devices allocated to a composed system.

To facilitate accurate and efficient estimation of the operation of an information handling system, the system of FIG. 1.1 may ascertain which hardware devices of each information handling system are active based on their respective allocation or lack of allocation to composed systems. By doing so, the power requirements, thermal load generation, and/or other characteristics regarding the operation of an information handling system may be estimated. Consequently, the operation of corresponding devices (e.g., power supplies, fans, etc.) for managing the operation of the information handling system may be set in a manner that reflects the actual operation of the system (as opposed to the operation of a composed information handling system that utilizes all, or a part, of the resources of an information handling system).

To manage the operation of information handling systems, the system may include a system control processor manager (50). The system control processor manager (50) may provide composed information handling system management services. Composed information handling system management services may include (i) obtaining composition requests for composed information handling systems from, for example, the clients (40), (ii) allocating computing resources from the information handling systems (60) and/or external resources (30) using system control processors to service the composition requests by instantiating composed information handling systems in accordance with the requests, and (iii) updating the operation of management controllers of information handling systems based on the computing resource allocations. By doing so, instantiated composed information handling systems may provide computer implemented services while information handling systems properly manage their power, thermal, and/or other states based on the use of their computing resources by the composed information handling systems.

The system control processor manager (50) may instantiate the composed information handling systems in accordance with a three resource set model. As will be discussed in greater detail below, the computing resources of an information handling system may be divided into three logical resource sets: a compute resource set, a control resource set, and a hardware resource set. Different resource sets, or portions thereof, from the same or different information handling systems may be aggregated (e.g., caused to operate as a computing device) to instantiate a composed information handling system having at least one resource set from each set of the three resource set model.

By logically dividing the computing resources of an information handling system into these resource sets, different quantities and types of computing resources may be allocated to each composed information handling system thereby enabling the resources allocated to the respective information handling system to match performed workloads. Further, dividing the computing resources in accordance with the three set model may enable different resource sets to be differentiated (e.g., given different personalities) to provide different functionalities. Consequently, composed information handling systems may be composed on the basis of desired functionalities rather than just on the basis of aggregate resources to be included in the composed information handling system.

Additionally, by composing composed information handling systems in this manner, the control resource set of each composed information handling system may be used to consistently deploy management services across any number of composed information handling systems. Consequently, embodiments of the invention may provide a framework for unified security, manageability, resource management/composability, workload management, and distributed system management by use of this three resource set model. For example, entities tasked with monitoring the health of computing resources of the composed information handling systems may be deployed in control resource sets. Accordingly, the health of these computing resources for providing computer implemented services requested by the clients (40) may be uniformly monitored across the information handling systems (60). For additional details regarding the system control processor manager (50), refer to FIG. 4.

Further, in one or more embodiments of the invention, the control resource set of each information handling system may also provide baseboard management functionality for the information handling system. For example, the control resource set may identify the power load, thermal load, and/or other characteristics regarding the operation of the information handling system. Based on this identification, the control resource set may set the operating point of any number of devices (e.g., power supplies, fans, etc.) for managing these characteristics of the operation of the information handling system. Rather than identifying these characteristics based on the hardware resources allocated to composed systems that include the control resource set, the control resource set may identify these characteristics (e.g., by generating estimations) based on the hardware components of an information handling system that are likely to be active based on their allocation to composed information handling systems. By doing so, the control resource set may operate its managed devices (e.g., fans, power supplies, etc.) in accordance with the likely operation of its hardware devices rather than the hardware devices allocated to composed information handling systems which may include hardware devices that are not hosted by the information handling system.

In one or more embodiments of the invention, a composed information handling system is a device that is formed using all, or a portion, of the computing resources of the information handling systems (60), the external resources (30), and/or other types of hardware devices operably connected to the information handling systems (60). The composed information handling system may utilize the computing resources allocated to it to provide computer implemented services. Consequently, a composed information handling system may cause hardware devices hosted by any number of information handling system and/or external resources to enter active states. Thus, the activity level of the hardware devices allocated to a composed information handling system may be different from the activity level of hardware devices of an information handling system.

To instantiate composed information handling systems, the information handling systems (60) may include at least three resource sets including a control resource set. The control resource set may include a system control processor. The system control processor of each information handling system may coordinate with the system control processor manager (50) to enable composed information handling systems to be instantiated. For example, the system control processor of an information handling system may provide telemetry data regarding the computing resources of an information handling system, may perform actions on behalf of the system control processor manager (50) to aggregate computing resources together, may monitor the utilization and/or activity of computing resources for providing computer implemented services requested by the clients (40), and/or may provide services that unify the operation of composed information handling systems.

In one or more embodiments of the invention, compute resource sets of composed information handling systems are presented with bare metal resources by control resource sets even when the presented resources are actually being managed using one or more layers of abstraction such as emulation, virtualization, indirection, security model, data integrity model, etc. For example, the system control processors of the control resource sets may provide the abstraction, emulation, virtualization, indirection, and/or other services while presenting the resources as bare metal resources. Consequently, these services may be transparent to applications hosted by the compute resource sets of composed information handling systems thereby enabling uniform deployment of such services without requiring implementation of control plane entities hosted by the compute resource sets of the composed information handling systems.

However, by presenting all hardware devices, even those hosted by other information handling systems or external devices, as bare metal resources, control plane entities may be unable to accurately ascertain the utilization rate of hardware devices of an information handling system. Embodiments of the invention may address this, and/or other issues in estimating resource utilization, by maintaining an active device map that specifies the devices of an information handling system that are allocated to any composed information handling system. By doing so, the aggregate operation of an information handling system may be identified and used to set the operating point of management devices for the information handling system. For additional details regarding the information handling systems (60), refer to FIG. 1.2.

The external resources (30) may provide computing resources that may be allocated for use by composed information handling systems. For example, the external resources (30) may include hardware devices that provide any number and type of computing resources. The composed information handling system may use these resources to provide their functionalities. For example, system control processors may operably connect to and manage the external resources (30) to provide additional and/or different computing resources from those available to be provided only using hardware resource sets of information handling systems. By utilizing system control processors to manage these resources, the use of these external resources (30) for providing services requested by the clients (40) may also be efficiently and transparently monitored.

Different external resources (e.g., 32, 34) may provide similar or different computing resources. For example, some external resources may include large numbers of hard disk drives to provide storage resources while others may include graphics processing unit rendering farms. The external resources (30) may include any number and type of computing resources for allocation to composed information handling systems via system control processors of control resource sets.

The system of FIG. 1.1 may include any number of information handling systems (e.g., 62, 64), any number of external resources (e.g., 32, 34), and any number of system control processor managers (e.g., 50). Any of the components of FIG. 1.1 may be operably connected to any other component and/or other components not illustrated in FIG. 1.1 via one or more networks (e.g., 130). The networks may be implemented using any combination of wired and/or wireless network topologies.

The clients (40), system control processor manager (50), information handling systems (60), and/or external resources (30) may be implemented using computing devices. The computing devices may include, for example, a server, laptop computer, a desktop computer, a node of a distributed system, etc. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the system control processor manager (50), information handling systems (60), and/or external resources (30) described in this application and/or all, or a portion, of the methods illustrated in FIGS. 5-6.2. The clients (40), system control processor manager (50), information handling systems (60), and/or external resources (30) may be implemented using other types of computing devices without departing from the invention. For additional details regarding computing devices, refer to FIG. 8.

While the system of FIG. 1.1 has been illustrated and described as including a limited number of specific components, a system in accordance with embodiments of the invention may include additional, fewer, and/or different components without departing from the invention.

Turning to FIG. 1.2, FIG. 1.2 shows a diagram of an information handling system (100) in accordance with one or more embodiments of the invention. Any of the information handling systems (e.g., 60) of FIG. 1.1 may be similar to the information handling system (100) illustrated in FIG. 1.2.

As discussed above, the information handling system (100) may provide any quantity and type of computer implemented services. To provide the computer implemented services, resources of the information handling system may be used to instantiate one or more composed information handling systems. The composed information handling systems may provide the computer implemented services.

To provide computer implemented services, the information handling system (100) may include any number and type of hardware devices including, for example, one or more processors (106), any quantity and type of processor dedicated memory (104), one or more system control processors (114), and any number of hardware resources (118). These hardware devices may be logically divided into three resource sets including a compute resource set (102), a control resource set (108), and a hardware resource set (110).

The control resource set (108) of the information handling system (100) may facilitate formation of composed information handling systems and management of the operation of the information handling system (100). To do so, the control resource set (108) may prepare any quantity of resources from any number of hardware resource sets (e.g., 110) (e.g., of the information handling system (100) and/or other information handling systems) for presentation to processing resources of any number of computing resource sets (e.g., 102) (e.g., of the information handling system (100) and/or other information handling systems). Once prepared, the control resource set (108) may present the prepared resources as bare metal resources to the processors (e.g., 106) of the allocated computing resources. By doing so, a composed information handling system may be instantiated.

To prepare the resources of the hardware resource sets for presentation, the control resource set (108) may employ, for example, virtualization, indirection, abstraction, and/or emulation. These management functionalities may be transparent to applications hosted by the resulting instantiated composed information handling systems. Consequently, while unknown to the control plane entities of the composed information handling system, the composed information handling system may operate in accordance with any number of management models thereby providing for unified control and management of composed information handling systems. These functionalities may be transparent to applications hosted by composed information handling systems thereby relieving them from overhead associated with these functionalities.

For example, consider a scenario where a compute resource set is instructed to instantiate a composed information handling system including a compute resource set and a hardware resource set that will contribute storage resources to the compute resource set. The compute resource set may virtualize the storage resources of the hardware resource set to enable a select quantity of the storage resources to be allocated to the composed information handling system while reserving some of the storage resources for allocation to other composed information handling systems. However, the prepared storage resources may be presented to the compute resource set as bare metal resources. Consequently, the compute resource set may not need to host any control plane entities or otherwise incur overhead for utilizing the virtualized storage resources (e.g., the compute resource set may send bare metal communications to the control resource set, the control resource set may translate those bare metal communications into prepared resource compatible communications, and the control resource set may send the prepared resource compatible communications to the hardware resource set).

The control resource set (108) may also enable the utilization of any of the hardware components of the information handling system (100) by respective clients. When a composed information handling system is instantiated, it (and its hardware devices) may be utilized by a client by enabling the client to load application onto the composed information handling system. For example, the client may cause the composed information handling system to execute applications on the compute resource set (102) which, in turn, may utilize any number of hardware resource sets (e.g., 110) as part of their execution.

Because the control resource set (108) may mediate utilization of hardware resource sets (110) by compute resource sets (102), the control resource set (108) may transparently ascertain the utilization of the hardware devices of these resource sets. To do so, the control resource set (108) may (i) intercept (as part of presenting computing resources of hardware resource sets to compute resource sets) communications between resource sets which may be used to infer the utilization of these hardware devices.

As noted above, while an information handling system is operating, it may consume electrical power and generate heat. To manage these characteristics of its operation, the information handling system (100) may include any number of managed devices (115). The managed devices (115) may include fans, power supplies, and/or other devices that facilitate operation of the information handling system (100).

These managed devices (115) may be managed by the system control processors (114). To set the operating point (e.g., rate of operation/services provided by them) of these devices (e.g., by providing predetermined amounts of power to them), the system control processors (114) may ascertain the actual operating states of any number of the hardware devices of the compute resource set (102) and/or the hardware resources (118). The operating states may be based on the allocation states of these hardware devices to composed information handling systems. In other words, the system control processors (114) may utilize the inclusion or lack of inclusion of hardware devices in composed information handling systems to ascertain how to set the operating points of the managed devices (115) and/or for notifying other entities of conditions that may impact the operation of the information handling system (100).

For example, the system control processors (114) may notify administrators or other individuals if the system control processors (114) determine that a power load of the operation of the hardware devices of the information handling system (e.g., its power envelope) are likely to exceed the ability of power supplies to power the information handling system (100), the ability of fans or other devices to cool the information handling system (100), etc. By making these determinations based on the allocation states of the hardware devices of the information handling systems, the system control processors may be more likely to generate accurate load/envelope estimates for the information handling system. Consequently, the operating points for the managed devices (115) may be more accurately set thereby reducing power consumption for management purposes and/or improving the likelihood that management services are provided at rates commensurate with the operation of the information handling system (100).

The processors (106) of the compute resource set (102) may be operably connected to one or more system control processors (114) of the control resource set (108). For example, the processors (106) may be connected to a compute resource interface (112), which is also connected to the system control processors (114). The compute resource interface (112) may enable the processors (106) to communicate with other entities via bare metal communications. Also, the compute resource interface (112) may enable system control processors (114) of the control resource set (108) to monitor the activity and/or utilization of the processors (106) and/or processor dedicated memory (104) to identify use of these hardware devices by clients. For example, the compute resources interface (112) may support sideband communications to the hardware devices of the compute resource set (102) thereby enabling health information for these hardware devices to be obtained by the system control processors (114).

The system control processors (114) of the control resource set (108) may present computing resources to the processors (106) as bare metal resources. In other words, from the point of view of the processors (106), any number of bare metal resources may be operably connected to it via the compute resources interface (112) when, in reality, the system control processors (114) are operably connected to the processors (106) via the compute resources interface (112). In other words, the system control processors (114) may manage presentation of other types of resources (e.g., computing resources of the hardware resource set (110), external resources, other hardware resource sets of other information handling systems, etc.) to the compute resource set (102).

By presenting the computing resources to the processors as bare metal resources, control plane entities (e.g., applications) such as hypervisors, emulators, and/or other types of management entities may not need to be hosted (e.g., executed) by the processors (106) for the processors (106) and entities hosted by them to utilize the computing resources allocated to a composed information handling system. Accordingly, all of the processing resources provided by the compute resource set (102) may be dedicated to providing the computer implemented services.

For example, the processors (106) may utilize mapped memory addresses to communicate with the bare metal resources presented by the system control processors (114) to the processors (106). The system control processors (114) may obtain these communications and appropriately remap (e.g., repackage, redirect, encapsulate, etc.) the communications to the actual hardware devices providing the computing resources, which the processors (106) are interacting with via the compute resources interface (112) and/or hardware resources interface (116), discussed below. Consequently, indirection, remapping, and/or other functions required for resource virtualization, emulation, abstraction, or other methods of resource allocation (other than bare metal) and management may not need to be implemented via the processors (106).

By doing so, any number of functions for a composed information handling system may be automatically performed in a manner that is transparent to the control plane. Accordingly, a composed information handling system may operate in a manner consistent with a unified, consistent architecture or model (e.g., communications model, data storage model, etc.) by configuring the operation of one or more system control processors in a manner consistent with the architecture or model.

In one or more embodiments of the invention, control plane entities utilize computing resources presented through one or more layers of indirection, abstraction, virtualization, etc. In other words, an indirect use of hardware devices and computing resources provided thereby. In the information handling system of FIG. 1.2, the system control processors (114) may present abstracted resources, indirection layers, virtualization layers, etc. as bare metal resources.

In one or more embodiments of the invention, data plane entities directly utilize computing resources. For example, data plane entities may instruct hardware devices on their operation thereby directly utilizing computing resources provided thereby. Data plane entities may present the computing resources to control plane entities using one or more layers of indirection, abstraction, virtualization, etc.

The system control processors (114) may present any number of resources operably connected to it (e.g., the hardware resource set (110)), other resources operably connected to it via an interface (e.g., hardware resources interface (116), etc.) as bare metal resources to the processors (106) of the compute resource set (102). Consequently, the system control processors (114) may implement device discovery processes compatible with the processors (106) to enable the processors (106) to utilize the presented computing resources. Accordingly, the control plane of a composed information handling system may believe that any number of resources may be directly accessible as bare metal resources even when the resources are, for example, hosted by other information handling systems.

For example, the hardware resource set (110) may include hardware resources (118) operably connected to the system control processors (114) via a hardware resources interface (116). The hardware resources (118) may include any number and type of hardware devices that provide computing resources. For additional details regarding the hardware resources (118), refer to FIG. 2.

In another example, the system control processors (114) may be operably connected to other hardware resource sets of other information handling systems via hardware resources interface (116), network (130), and/or other system control processors of the other information handling systems. The system control processors may cooperatively enable hardware resource sets of other information handling systems to be prepared and presented as bare metal resources to the compute resource set (102).

In an additional example, the system control processors (114) may be operably connected to external resources via hardware resources interface (116) and network (130). The system control processors (114) may prepare and present the external resources as bare metal resources to the compute resource set (102).

The system control processors (114), by presenting resources to the compute resource set (102), may be able to monitor the utilization of the presented resources in a manner that is transparent to the applications or other entities executing using the processors (106). Consequently, these entities may not be able to interfere with monitoring of the use of these resources. In contrast, if an agent or other entity for monitoring computing resource health is executing using the processors (106), other entities executing using the processors (106) may be able to interfere with the operation of the monitoring entity. Accordingly, embodiments of the invention may provide a method of monitoring computing resources utilization that is less susceptible to interference by other entities.

Figure 3:
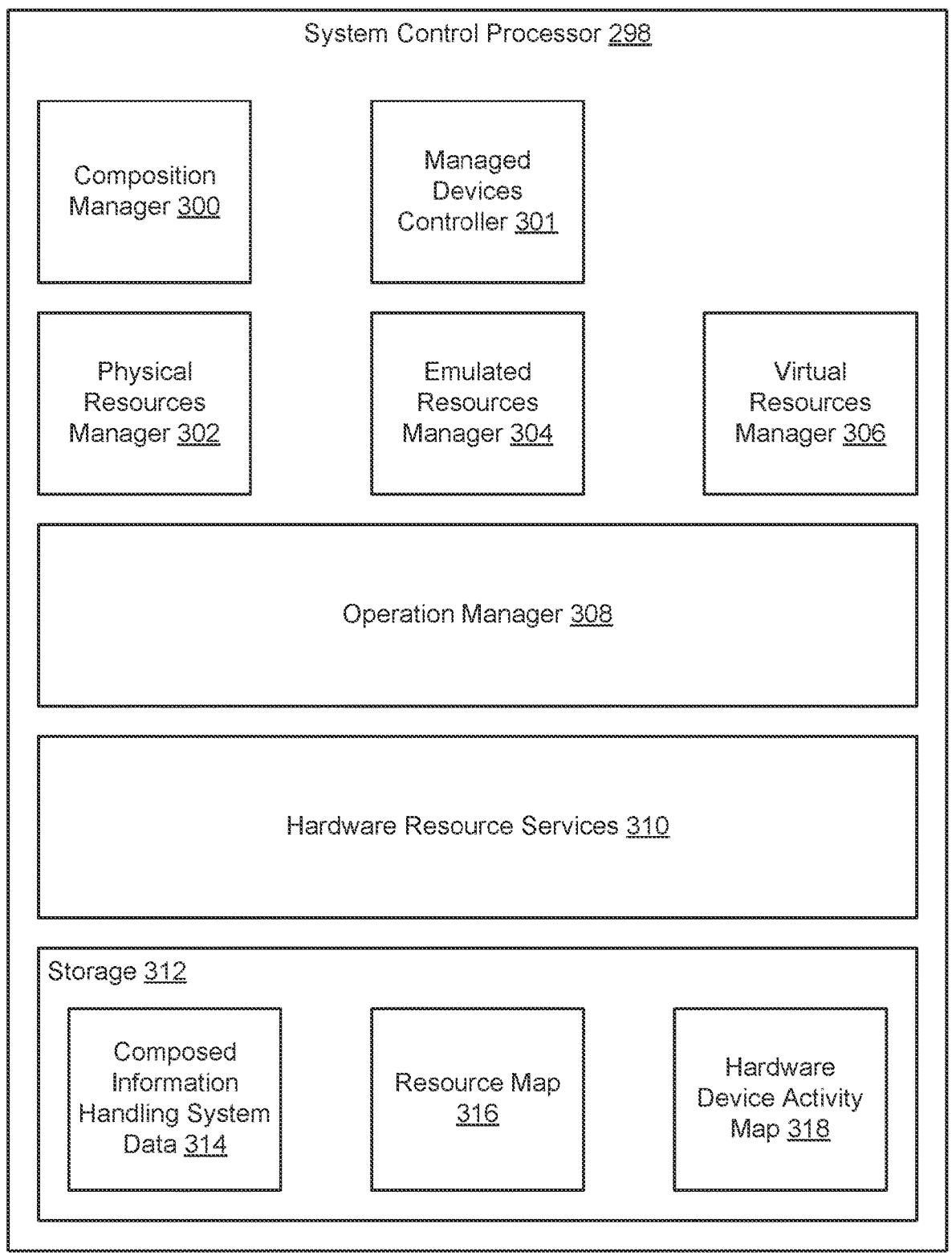
FIG. 3 shows a diagram of a system control processor in accordance with one or more embodiments of the invention.

For additional details regarding the operation and functions of the system control processors (114), refer to FIG. 3.

The compute resources interface (112) may be implemented using any suitable interconnection technology including, for example, system buses such as compute express links or other interconnection protocols. The compute resources interface (112) may support any input/output (IO) protocol, any memory protocol, any coherence interface, etc. The compute resources interface (112) may support processor to device connections, processor to memory connections, and/or other types of connections. The compute resources interface (112) may be implemented using one or more hardware devices including circuitry adapted to provide the functionality of the compute resources interface (112).

The compute resources interface (112) may also support sideband communications between the system control processors (114), the processors (106), and/or the processor dedicated memory (104). Consequently, the system control processors (114) may be able to monitor the operations of these other devices to identify the utilization of these hardware devices by clients, identify workloads being performed by these devices, etc.

The hardware resources interface (116) may be implemented using any suitable interconnection technology including, for example, system buses such as compute express links or other interconnection protocols. The hardware resources interface (116) may support any input/output (IO) protocol, any memory protocol, any coherence interface, etc. The hardware resources interface (116) may support processor to device connections, processor to memory connections, and/or other types of connections. The hardware resources interface (116) may be implemented using one or more hardware devices including circuitry adapted to provide the functionality of the hardware resources interface (116).

In some embodiments of the invention, the compute resource set (102), control resource set (108), and/or hardware resource set (110) may be implemented as separate physical devices. In such a scenario, the compute resources interface (112) and hardware resources interface (116) may include one or more networks enabling these resource sets to communicate with one another. Consequently, any of these resource sets (e.g., 102, 108, 110) may include network interface cards or other devices to enable the hardware devices of the respective resource sets to communicate with each other.

In one or more embodiments of the invention, the system control processors (114) support multiple, independent connections. For example, the system control processors (114) may support a first network communications connection (e.g., an in-band connection) that may be allocated for use by applications hosted by the processors (106). The system control processors (114) may also support a second network communications connection (e.g., an out-of-band connection) that may be allocated for use by applications hosted by the system control processors (114). The out-of-band connection may be utilized for management and control purposes while the in-band connection may be utilized to provide computer implemented services. These connections may be associated with different network endpoints thereby enabling communications to be selectively directed toward applications hosted by the processors (106) and/or system control processors (114). As will be discussed in greater detail with respect to FIG. 3, the system control processors (114) may utilize the out-of-band connections to communicate with other devices to manage (e.g., instantiate, monitor, modify, etc.) composed information handling systems and identify active hardware devices of the information handling systems.

The network (130) may correspond to any type of network and may be operably connected to the Internet or other networks thereby enabling the information handling system (100) to communicate with any number and type of other devices.

The information handling system (100) may be implemented using computing devices. The computing devices may be, for example, a server, laptop computer, desktop computer, node of a distributed system, etc. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the information handling system (100) described in this application and/or all, or a portion, of the methods illustrated in FIGS. 5-6.2. The information handling system (100) may be implemented using other types of computing devices without departing from the invention. For additional details regarding computing devices, refer to FIG. 8.

While the information handling system (100) has been illustrated and described as including a limited number of specific components, an information handling system in accordance with embodiments of the invention may include additional, fewer, and/or different components without departing from the invention.

Turning to FIG. 2, FIG. 2 shows a diagram of the hardware resources (118) in accordance with one or more embodiments of the invention. As noted above, system control processors of information handling systems may present resources including, for example, some of the hardware resources (118) to form a composed information handling system.

The hardware resources (118) may include any number and types of hardware devices that may provide any quantity and type of computing resources. For example, the hardware resources (118) may include storage devices (200), memory devices (202), and special purpose devices (204).

The storage devices (200) may provide storage resources (e.g., persistent storage) in which applications hosted by a composed information handling system may store data including any type and quantity of information. The storage devices (200) may include any type and quantity of devices for storing data. The devices may include, for example, hard disk drives, solid state drives, tape drives, etc. The storage devices (200) may include other types of devices for providing storage resources without departing from the invention. For example, the storage devices (200) may include controllers (e.g., redundant array of disk controllers), load balancers, and/or other types of devices.

The memory devices (202) may provide memory resources (e.g., transitory and/or persistent storage) in which a composed information handling system may store data including any type and quantity of information. The memory devices (202) may include any type and quantity of devices for storing data. The devices may include, for example, transitory memory such as random access memory, persistent memory such as enterprise class memory, etc. The memory devices (202) may include other types of devices for providing memory resources without departing from the invention. For example, the storage devices (200) may include controllers (e.g., replication managers), load balancers, and/or other types of devices.

The special purpose devices (204) may provide other types of computing resources (e.g., graphics processing resources, computation acceleration resources, etc.) to composed information handling systems. The special purpose devices (204) may include any type and quantity of devices for providing other types of computing resources. The special purpose devices (204) may include, for example, graphics processing units for providing graphics processing resources, compute accelerators for accelerating corresponding workloads performed by composed information handling systems, application specific integrated circuits (ASICs) for performing other functionalities, digital signal processors for facilitating high speed communications, etc. The special purpose devices (204) may include other types of devices for providing other types of computing resources without departing from the invention.

The system control processors of the information handling systems may mediate presentation of the computing resources provided by the hardware resources (118) to computing resource sets (e.g., as bare metal resources to processors). When doing so, the system control processors may provide a layer of abstraction that enables the hardware resources (118) to be, for example, virtualized, emulated as being compatible with other systems, and/or directly connected to the compute resource sets (e.g., pass through). Consequently, the computing resources of the hardware resources (118) may be finely, or at a macro level, allocated to different composed information handling systems.

Additionally, the system control processors may manage operation of these hardware devices in accordance with one or more models including, for example, data protection models, security models, workload performance availability models, reporting models, etc. For example, the system control processors may cause multiple copies of data to be redundantly stored, to be stored with error correction code, and/or other information usable for data integrity purposes.

The manner of operation of these devices may be transparent to the computing resource sets utilizing these hardware devices for providing computer implemented services. Consequently, even though the resulting composed information handling system control plane may be unaware of the implementation of these models, the composed information handling systems may still operate in accordance with these models thereby providing a unified method of managing the operation of composed information handling systems.

The operation of any of the hardware resources (118) may consume power and generate heat. Consequently, when any of these hardware devices are allocated to a composed information handling system, these devices may be taken into account when calculating a power envelope of a composed information handling system.

While the hardware resources (118) have been illustrated and described as including a limited number of specific components, hardware resources in accordance with embodiments of the invention may include additional, fewer, and/or different components without departing from the invention.

As discussed above, information handling systems may include system control processors that may be used to instantiate composed information handling systems. FIG. 3 shows a diagram of a system control processor (298) in accordance with one or more embodiments of the invention. Any of the system control processors included in control resources sets of FIG. 1.2 may be similar to the system control processor (298) illustrated in FIG. 3.

The system control processor (298) may facilitate instantiation, reallocation of resources to/from composed systems, operation of composed information handling systems, and management of information handling systems. By doing so, a system that includes information handling systems may dynamically instantiate and recompose (e.g., add/remove/replace resources) composed information handling systems to provide computer implemented services.

To instantiate and operate composed information handling systems, the system control processor (298) may include a composition manager (300), a managed devices controller (301), a physical resources manager (302), an emulated resources manager (304), a virtual resources manager (306), an operation manager (308), hardware resource services (310), and storage (312). Each of these components of the system control processor is discussed below.

The composition manager (300) may manage the process of instantiating and operating composed information handling systems. To provide these management services, the composition manager (300) may include functionality to (i) obtain information regarding the hardware components of the information handling system (e.g., obtain telemetry data regarding the information handling system), (ii) provide the obtained information to other entities (e.g., management entities such as system control processor manager (50, FIG. 1.1)), (iii) obtain composition/recomposition requests for composed information handling systems, (iv) based on the composition requests, prepare and present resources as bare metal resources to compute resource sets, (v) instantiate applications in composed information handling systems to cause the composed information handling systems to provide computer implemented services, conform their operation to security models, etc., (vi) add/remove/recompose resources presented to the compute resource sets of composed information handling systems dynamically in accordance with utilization levels of the resources, (vii) coordinate with other system control processors to provide distributed system functionalities and/or transfer performance of applications and/or computer implemented services between composed information handling systems, and/or (viii) manage the operation of devices (e.g., managed devices (115, FIG. 1.2)). By providing the above functionalities, a system control processor in accordance with one or more embodiments of the invention may enable distributed resources from any number of information handling systems to be aggregated into a composed information handling system to provide computer implemented services.

To obtain information regarding the hardware components of the information handling system, the composition manager (300) may inventory the components of the information handling system hosting the system control processor. The inventory may include, for example, the type and model of each hardware component, versions of firmware or other code executing on the hardware components, and/or information regarding hardware components of the information handling system that may be allocated to form composed information handling systems.

The composition manager (300) may obtain composition requests from other entities (e.g., management entities tasked with instantiating composed information handling systems), as pre-loaded instructions present in storage of the system control processor, and/or via other methods. The composition requests may specify, for example, the types and quantities of computing resources to be allocated to a composed information handling system.

In one or more embodiments of the invention, the composition requests specify the computing resource allocations using an intent based model. For example, rather than specifying specific hardware devices (or portions thereof) to be allocated to a particular compute resource set to obtain a composed information handling system, the resource requests may only specify that a composed information handling system is to be instantiated having predetermined characteristics, that a composed information handling system will perform certain workloads or execute certain applications, and/or that the composed information handling system be able to perform one or more predetermined functionalities. In such a scenario, the composition manager may decide how to instantiate the composed information handling system (e.g., which resources to allocate, how to allocate the resources (e.g., virtualization, emulation, redundant workload performance, data integrity models to employ, etc.), to which compute resource set(s) to present corresponding computing resources, etc.).

In one or more embodiments of the invention, the composition requests specify the computing resource allocations using an explicit model. For example, the composition requests may specify (i) the resources to be allocated, (ii) the manner of presentation of those resources (e.g., emulating a particular type of device using a virtualized resource vs. path through directly to a hardware component), and (iii) the compute resource set(s) to which each of the allocated resources are to be presented.

In addition to specifying resource allocations, the composition requests may also specify, for example, applications to be hosted by the composed information handling systems, security models to be employed by the composed information handling systems, communication models to be employed by the composed information handling systems, services to be provided to the composed information handling systems, user/entity access credentials for use of the composed information handling systems, and/or other information usable to place the composed information handling systems into states in which the composed information handling systems provide desired computer implemented services.

To prepare and present resources to compute resource sets based on the composition requests, the system control processors may implement, for example, abstraction, indirection, virtualization, mapping, emulation, and/or other types of services that may be used to present any type of resources as a resource that is capable of bare metal utilization by compute resource sets. To provide these services, the composition manager (300) may invoke the functionality of the physical resources manager (302), the emulated resources manager (304), and/or the virtual resources manager (306).

When presenting the resources to the compute resource sets, the system control processor (298) may present the resources using an emulated data plane. For example, the system control processors (298) may receive bare metal communications (e.g., IO from the processors) and respond in a manner consistent with responses of corresponding bare metal devices (e.g., memory, storages, network interface cards, etc.). When doing so, the system control processor (298) may translate the communications into actions. The actions may be provided to the hardware devices used by the system control processor (298) to present the bare metal resources to the compute resource set(s). In turn, the hardware devices may perform the actions which results in a composed information handling system providing desired computer implemented services.

In some scenarios, multiple system control processors may cooperate to present bare metal resources to a compute resource set. For example, a single information handling system may not include sufficient hardware devices to present a quantity and/or type of resources to a compute resource set as specified by a composition request (e.g., present two storage devices to a compute resource set when a single information handling system only includes a single storage device). In this scenario, a second system control processor of a second information handling system operably connected to the system control processor tasked with presenting the resources to a compute resource set may prepare one of its storage devices for presentation. Once prepared, the second system control processor may communicate with the system control processor to enable the system control processor to present the prepared storage device (i.e., the storage device in the information handling system) to the compute resource set. By doing so, resources from multiple information handling systems may be aggregated to present a desired quantity of resources to compute resource set(s) to form a composed information handling system.

By forming composed information handling systems as discussed above, embodiments of the invention may provide a system that is able to effectively utilize distributed resources across a range of devices to provide computer implemented services.

In addition to instantiating composed information handling systems, the composition manager (300) may service recomposition requests. A recomposition request may request that some of the computing resources of a composed information handling system be modified to utilize other hardware devices for providing computing resources to the composed information handling system. To service recomposition requests, the composition manager (300) may identify corresponding free resources, allocate them to a composed information handling system, and deallocate the hardware devices replaced by the free resources. Once identified, the composition manager (300) may generate and send corresponding instructions to a system control processor of the composed information handling system.

Figure 5:
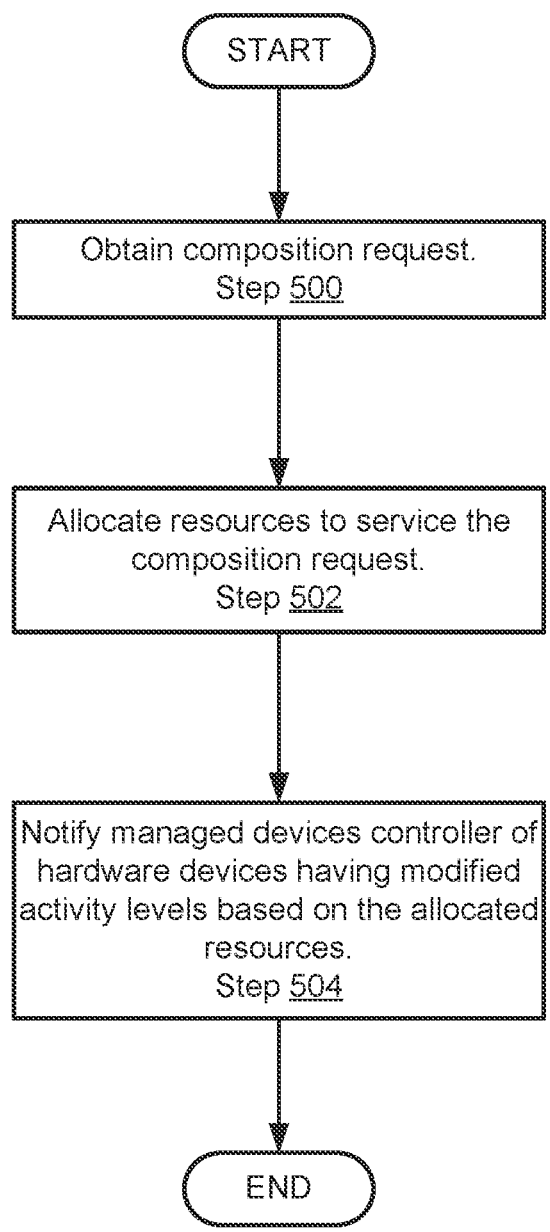
FIG. 5 shows a flowchart of a method of servicing composition requests in accordance with one or more embodiments of the invention.

When providing its functionality, the composition manager (300) may perform all, or a portion, of the methods illustrated in FIGS. 5-6.2.

After a composed information handling system is formed, the hardware devices of the composed information handling system may begin to operate thereby consuming power and generating heat. The managed devices controller (301) may manage any number of devices that facilitate the operation of an information handling system that hosts some or all of the hardware devices of the composed information handling system. To manage these devices, the managed devices controller (301) may maintain a hardware device activity map (318). The hardware device activity map (318) may specify the hardware devices of the information handling system that have been allocated to at least one composed information handling system.

The managed devices controller (301) may utilize the information included in the hardware device activity map (318) to set the operating points of the managed devices. For example, the managed devices controller (301) may calculate a power envelope for the information handling system using the hardware device activity map (318). Based on the power envelope, the managed devices controller (301) may set the operating points of, for example, power supplies, fans, and/or other types of devices that support the operation of the information handling system.

By utilizing the information included in the hardware device activity map (318), the managed devices controller (301) may set the operation of the managed devices based on the hardware devices that are likely to be in use based on their allocation status. Consequently, the operating points of the managed devices may be more accurately set by virtue of estimating the power envelope of the information handling system more accurately.

The managed devices controller (301) may maintain the hardware device activity map (318) based on information obtained from the system control processor manager. For example, when the system control processor manager orchestrates instantiation of a composed information handling system, it may notify system control processors of the information handling systems of the hardware devices allocated from them. Consequently, the composition requests from the system control processor may be utilized to identify the hardware devices of an information handling system that are likely to be active.

For example, consider a scenario where a system control processor sends a composition request to a system control processor indicating that its compute resource set is being allocated to a composed information handling system that also includes a storage device from another information handling system. In response to this message, the system control processor may update its hardware device activity map to indicate that its compute resource set is likely to be active without also indicating that the storage device is going to be active. Consequently, when the managed devices controller (301) calculates a power envelope, it will not take into account the power consumption of the storage device (e.g., only taking into account a subset of the hardware devices allocated to the composed information handling system that are only hosted by the information handling system). Accordingly, the power envelope will likely represent the power envelope of the information handling system (rather than the power envelope of the composed information handling system which is distributed across multiple information handling systems). Thus, the operating points of the managed devices of the information handling system may be set appropriately for operation of the compute resource set (as opposed to being over provisioned to handling both the compute resource set and the storage device).

When providing its functionality, the managed devices controller (301) may perform all, or a portion, of the methods illustrated in FIGS. 5-6.2.

While the managed devices controller (301) is illustrated in FIG. 3 as being part of the system control processor (298), the managed devices controller (301) may be implemented as a separate device from the system control processor (298) without departing from the invention.

The physical resources manager (302) may manage presentation of resources to compute resource sets. For example, the physical resources manager (302) may generate, for example, translation tables that specify actions to be performed in response to bare metal communications obtained from compute resource sets. The translation tables may be used to take action in response to communications from compute resource sets.

The physical resources manager (302) may generate the translation tables based on the components of the compute resource sets, allocations or other types of commands/communications obtained from the compute resource sets, and the resources of the information handling system(s) allocated to service the compute resource set. For example, when a compute resource set is presented with a bare metal resource, it may go through a discovery process to prepare the bare metal resource for use. As the discovery process proceeds, the compute resource set may send commands/communications to the bare metal resource to, for example, discover its address range. The physical resources manager (302) may monitor this process, respond appropriately, and generate the translation table based on these commands and the resources available to service these bare metal commands/communications (e.g., to obtain address translation tables, emulation tables, etc.).

For example, consider a scenario where a virtualized disk is allocated to service bare metal storage commands from a compute resource set. In such a scenario, the physical resources manager (302) may generate a translation table that translates physical write from the compute resource set to virtualized writes corresponding to the virtualized disk. Consequently, the virtualized disk may be used by the system control processor (298) to present bare metal resources to the compute resource set.

The emulated resources manager (304) may generate emulation tables that enable resources that would otherwise be incompatible with a compute resource set to be compatible with the compute resource set. Different types of hardware devices of a compute resource set may be compatible with different types of hardware devices. Consequently, resources allocated to provide bare metal resources may not necessarily be compatible with the hardware devices of a compute resource set. The emulated resources manager (304) may generate emulation tables that map bare metal communications obtained from a compute resource set to actions that are compatible with resources allocated to provide bare metal resources to the compute resource sets.

The virtual resources manager (306) may manage virtualized resources that may be allocated to provide bare metal resources to compute resource sets. For example, the virtual resources manager (306) may include hypervisor functionality to virtualized hardware resources and allocate portions of the virtualized resources for use in providing bare metal resources.

While the physical resources manager (302), emulated resources manager (304), and virtual resources manager (306) have been described as generating tables, these components of the system control processor may generate other types of data structures or utilize different management models to provide their respective functionalities without departing from the invention.

The functionalities of the physical resources manager (302), emulated resources manager (304), and virtual resources manager (306) may be utilized in isolation and/or combination to provide bare metal resources to compute resource sets. By doing so, the system control processor (298) may address compatibility issues, sizing issues to match available resources to those that are to be allocated, and/or other issues to enable bare metal resources to be presented to compute resource sets.

When providing bare metal resources, the composition manager (300) may invoke the functionality of the physical resources manager (302), emulated resources manager (304), and virtual resources manager (306). Consequently, resources may be presented as bare metal resources via pass-through (i.e., forwarding TO from compute resource sets to hardware devices), bare metal resource addressing of virtualized resources, and/or as emulated resources compatible with the hardware components of the compute resource set.

The functionality of the physical resources manager (302), emulated resources manager (304), and virtual resources manager (306) may be invoked using any communication model including, for example, message passing, state sharing, memory sharing, etc.

The operation manager (308) may manage the general operation of the system control processor (298). For example, the operation manager (308) may operate as an operating system or other entity that manages the resources of the system control processor (298). The composition manager (300), managed devices controller (301), physical resources manager (302), emulated resources manager (304), virtual resources manager (306), and/or other entities hosted by the system control processor (298) may call or otherwise utilize the operation manager (308) to obtain appropriate resources (e.g., processing resources, memory resources, storage, communications, etc.) to provide their functionalities.

The hardware resource services (310) may facilitate use of the hardware components of any number of hardware resource sets (e.g., 110, FIG. 1.2). For example, the hardware resource services (310) may include driver functionality to appropriately communicate with the hardware devices of hardware resource sets. The hardware resource services (310) may be invoked by, for example, the operation manager (308).

When providing their functionalities, any of the aforementioned components of the system control processor (298) may perform all, or a portion, of the methods illustrated in FIGS. 5-6.2.

The system control processor (298) may be implemented using computing devices. The computing devices may be, for example, an embedded computing device such as a system on a chip, a processing device operably coupled to memory and storage, or another type of computing device. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the system control processor (298) described in this application and/or all, or a portion, of the methods illustrated in FIGS. 5-6.2. The system control processor (298) may be implemented using other types of computing devices without departing from the invention. For additional details regarding computing devices, refer to FIG. 1.1.

In one or more embodiments of the invention, the system control processor (298) is implemented as an on-board device. For example, the system control processor (298) may be implemented using a chip including circuitry disposed on a circuit card. The circuit card may also host the compute resource sets and/or hardware resource sets managed by the system control processor (298).

In one or more embodiments of the invention, any of the composition manager (300), managed devices controller (301), physical resources manager (302), emulated resources manager (304), virtual resources manager (306), operation manager (308), and/or hardware resource services (310) are implemented using a hardware device including circuitry. The hardware device may be, for example, a digital signal processor, a field programmable gate array, or an application specific integrated circuit. The circuitry may be adapted to cause the hardware device to perform the functionality of the composition manager (300), managed devices controller (301), physical resources manager (302), emulated resources manager (304), virtual resources manager (306), operation manager (308), and/or hardware resource services (310). The composition manager (300), managed devices controller (301), physical resources manager (302), emulated resources manager (304), virtual resources manager (306), operation manager (308), and/or hardware resource services (310) may be implemented using other types of hardware devices without departing from the invention.

In one or more embodiments of the invention, any of the composition manager (300), managed devices controller (301), physical resources manager (302), emulated resources manager (304), virtual resources manager (306), operation manager (308), and/or hardware resource services (310) are implemented using a processor adapted to execute computing code stored on a persistent storage (e.g., as part of the system control processor (298) or operably connected to the system control processor (298) thereby enabling processors of the system control processor (298) to obtain and execute the computing code) that when executed by the processor performs the functionality of the composition manager (300), managed devices controller (301), physical resources manager (302), emulated resources manager (304), virtual resources manager (306), operation manager (308), and/or hardware resource services (310). The processor may be a hardware processor including circuitry such as, for example, a central processing unit or a microcontroller. The processor may be other types of hardware devices for processing digital information without departing from the invention.

As used herein, an entity that is programmed to perform a function (e.g., step, action, etc.) refers to one or more hardware devices (e.g., processors, digital signal processors, field programmable gate arrays, application specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified) to perform the function. An entity that is programmed to perform a function does not include computer instructions in isolation from any hardware devices. Computer instructions may be used to program a hardware device that, when programmed, provides the function.

In one or more embodiments disclosed herein, the storage (312) is implemented using physical devices that provide data storage services (e.g., storing data and providing copies of previously stored data). The devices that provide data storage services may include hardware devices and/or logical devices. For example, storage (312) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (312) may include a memory device (e.g., a dual in line memory device) in which data is stored and from which copies of previously stored data are provided. In another example, storage (312) may include a persistent storage device (e.g., a solid-state disk drive) in which data is stored and from which copies of previously stored data is provided. In a still further example, storage (312) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (312) may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage (312) may store data structures including, for example, composed information handling system data (314), a resource map (316), and a hardware device activity map (318). Each of these data structures is discussed below.

The composed information handling system data (314) may be implemented using one or more data structures that includes information regarding composed information handling systems. For example, the composed information handling system data (314) may specify identifiers of composed information handling systems and resources that have been allocated to the composed information handling systems.

The composed information handling system data (314) may also include information regarding the operation of the composed information handling systems. The information may include, for example, workload performance data, resource utilization rates over time, and/or other information that may be utilized to manage the operation of the composed information handling systems.

The composed information handling system data (314) may further include information regarding management models employed by system control processors. For example, the composed information handling system data (314) may include information regarding duplicative data stored for data integrity purposes, redundantly performed workloads to meet high availability service requirements, encryption schemes utilized to prevent unauthorized access of data, etc.

The composed information handling system data (314) may be maintained by, for example, the composition manager (300). For example, the composition manager may add, remove, and/or modify information included in the composed information handling system data (314) to cause the information included in the composed information handling system data (314) to reflect the state of the composed information handling systems.

The data structures of the composed information handling system data (314) may be implemented using, for example, lists, tables, unstructured data, databases, etc. While illustrated in FIG. 3 as being stored locally, the composed information handling system data (314) may be stored remotely and may be distributed across any number of devices without departing from the invention.

The resource map (316) may be implemented using one or more data structures that include information regarding resources of the information handling system and/or other information handling systems. For example, the resource map (316) may specify the type and/or quantity of resources (e.g., hardware devices, virtualized devices, etc.) available for allocation and/or that are already allocated to composed information handling systems. The resource map (316) may be used to provide data to management entities such as system control processor managers.

The data structures of the resource map (316) may be implemented using, for example, lists, tables, unstructured data, databases, etc. While illustrated in FIG. 3 as being stored locally, the resource map (316) may be stored remotely and may be distributed across any number of devices without departing from the invention.

The resource map (316) may be maintained by, for example, the composition manager (300). For example, the composition manager (300) may add, remove, and/or modify information included in the resource map (316) to cause the information included in the resource map (316) to reflect the state of the information handling system and/or other information handling systems.

The hardware device activity map (318) may be implemented using one or more data structures that includes information regarding the activity status of one or more hardware devices of an information handling system. For example, the hardware device activity map (318) may specify whether each hardware device of the information handling system has been allocated to any composed information handling system. If a hardware device has been allocated, it may be presumed to be active during operation of the information handling system. If a hardware device has not been allocated, it may be presumed to be inactive during operation of the information handling device.

The hardware device activity map (318) may granularly specify the activity status of the hardware devices. For example, the hardware device activity map (318) may indicate an expected level activity (e.g., out of a possible maximum activity level) for each hardware device. The aforementioned statuses may be based on a level of allocation of the hardware devices. As noted above, in some embodiments of the invention, devices may be virtualized and only, in part, allocated for use (e.g., a subset of the resources of the device). Consequently, the hardware device activity map (318) may specify fractional activity levels of the hardware devices.

The hardware device activity map (318) may be maintained by, for example, the managed devices controller (301). For example, the managed devices controller (301) may add, remove, and/or modify information included in the hardware device activity map (318) to cause the information included in the hardware device activity map (318) to reflect the current health of the hardware devices that provide computing resources to composed information handling systems. The managed devices controller (301) may do so based on information obtained from system control processor managers.

The data structures of the hardware device activity map (318) may be implemented using, for example, lists, tables, unstructured data, databases, etc. While illustrated in FIG. 3 as being stored locally, the hardware device activity map (318) may be stored remotely and may be distributed across any number of devices without departing from the invention.

While the storage (312) has been illustrated and described as including a limited number and type of data, a storage in accordance with embodiments of the invention may store additional, less, and/or different data without departing from the invention.

While the system control processor (298) has been illustrated and described as including a limited number of specific components, a system control processor in accordance with embodiments of the invention may include additional, fewer, and/or different components without departing from the invention.

Figure 4:
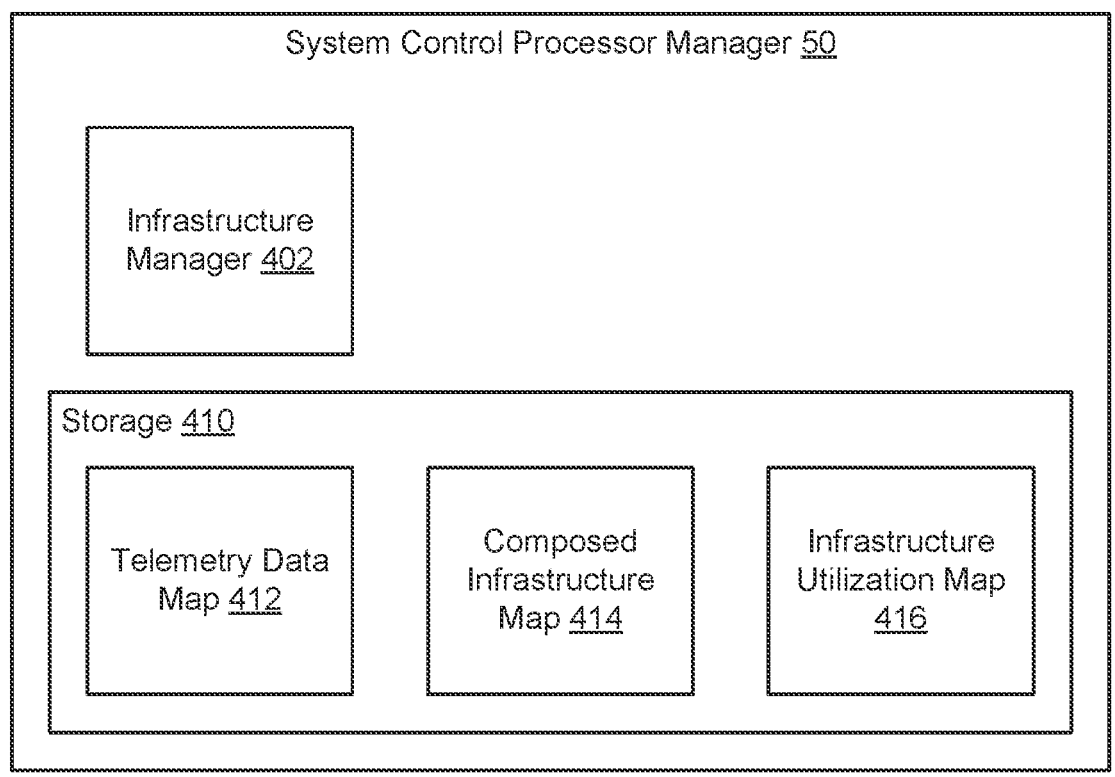
FIG. 4 shows a diagram of a system control processor manager in accordance with one or more embodiments of the invention.

As discussed above, a system control processor manager may cooperate with system control processors of control resource sets to instantiate composed information handling systems by presenting computing resources from hardware resource sets to processors of compute resource sets. FIG. 4 shows a diagram of the system control processor manager (50) in accordance with one or more embodiments of the invention.

The system control processor manager (50) may manage the process of instantiating composed information handling systems and recomposing composed information handling systems over time. To do so, the system control processor manager (50) may include an infrastructure manager (402) and storage (410). Each of these components is discussed below.

The infrastructure manager (402) may provide composition services.

Composition services may include obtaining composition/recomposition requests for composed information handling systems, determining the resources to allocate to instantiate composed information handling systems, add/remove resources to recompose composed information handling systems, manage transfers of workloads between composed information handling systems for recomposition purposes, and cooperating with system control processors to allocate the identified resources. By doing so, the infrastructure manager (402) may cause any number of computer implemented services to be provided using the composed information handling systems.

To determine the resources to allocate to new composed information handling systems, the infrastructure manager (402) may employ an intent based model that translates an intent expressed in a composition request to one more allocations of computing resources. For example, the infrastructure manager (402) may match an expressed intent to resources to be allocated to satisfy that intent. A lookup table may specify the type, quantity, method of management, and/or other information regarding any number of computing resources that when aggregated will be able to satisfy a corresponding intent. The infrastructure manager (402) may identify resources for allocation to satisfy composition requests via other methods without departing from the invention.

To recompose composed information handling systems, the infrastructure manager (402) may add or remove resources from existing composed information handling systems or instantiate new composed information handling systems and transfer workloads from existing composed information handling systems to the new composed information handling systems. Consequently, the composed information handling systems performing the workloads may have different amounts and/or types of computing resources after being recomposed.

For example, to recompose a composed information handling system having a failed storage resource, the infrastructure manager may instruct a system control processor of the composed information handling system to allocate a new storage resource, transfer data from the failed storage resource to the new storage resource, and deallocate the failed storage resource. By doing so, composed information handling systems may be more likely to be able to continue to provide desired computer implemented services (as opposed to services that may be impeded due to compromised storage resources).

To cooperate with the system control processors for composed information handling system composition and recomposition purposes, the infrastructure manager (402) may obtain telemetry data regarding the computing resources of any number of information handling systems and/or external resources that are available for allocation. The infrastructure manager (402) may aggregate this data in a telemetry data map (412), which may be subsequently used to identify resources of any number of information handling systems and/or external resources to satisfy composition and/or recomposition requests (e.g., instantiate one or more composed information handling systems to meet the requirements of the composition requests, modify resource allocations to existing composed information handling systems, etc.).

When the infrastructure manager (402) identifies the computing resources to be allocated, the infrastructure manager (402) may communicate with any number of system control processors (e.g., of control resource sets of information handling systems) to implement the identified allocations. For example, the infrastructure manager (402) may notify a system control processor of a control resource set that portions of a hardware resource set are to be allocated to a compute resource set to instantiate a composed information handling system. The system control processor may then take action (e.g., prepare the portion of the hardware resource set for presentation to a processor of the compute resource set) in response to the notification.

The infrastructure manager (402) may also notify information handling systems impacted by composition/recompositions of composed information handling systems. Specifically, the infrastructure manager (402) may notify the managed devices controllers of these information handling systems of allocations/deallocations of its hardware devices. The managed devices controllers may update hardware device activity maps (e.g., 318, FIG. 3) based on this information. Consequently, each information handling system and its managed devices controller may be aware of its hardware devices that are likely to be active.

As composed information handling systems are instantiated and/or recomposed, the infrastructure manager (402) may add information reflecting the resources allocated to composed information handling systems, the workloads being performed by the composed information handling systems, and/or other types of information to an infrastructure utilization map (416). The infrastructure manager (402) may utilize this information to, for example, decide whether computing resources should be added to or removed from composed information handling system (e.g., whether the computing resources are free for allocation or currently utilized by other entities). Consequently, computing resources may be dynamically re-provisioned.

In one or more embodiments of the invention, the infrastructure manager (402) is implemented using a hardware device including circuitry. The hardware device may be, for example, a digital signal processor, a field programmable gate array, or an application specific integrated circuit. The circuitry may be adapted to cause the hardware device to perform the functionality of the infrastructure manager (402). The infrastructure manager (402) may be implemented using other types of hardware devices without departing from the invention.

In one or more embodiments of the invention, the infrastructure manager (402) is implemented using a processor adapted to execute computing code stored on a persistent storage that when executed by the processor performs the functionality of the infrastructure manager (402). The processor may be a hardware processor including circuitry such as, for example, a central processing unit or a microcontroller. The processor may be other types of hardware devices for processing digital information without departing from the invention.

When providing its functionality, the infrastructure manager (402) may perform all, or a portion, of the methods illustrated in FIGS. 5-6.2.

In one or more embodiments disclosed herein, the storage (410) is implemented using physical devices that provide data storage services (e.g., storing data and providing copies of previously stored data). The devices that provide data storage services may include hardware devices and/or logical devices. For example, storage (410) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (410) may include a memory device (e.g., a dual in-line memory device) in which data is stored and from which copies of previously stored data are provided. In another example, storage (410) may include a persistent storage device (e.g., a solid-state disk drive) in which data is stored and from which copies of previously stored data is provided. In a still further example, storage (410) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (410) may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage (410) may store data structures including, for example, the telemetry data map (412), the composed infrastructure map (414), and the infrastructure utilization map (416). These data structures may be maintained by, for example, the infrastructure manager (402). For example, the infrastructure manager (402) may add, remove, and/or modify information included in these data structures to cause the information included in these data structure to reflect the state of any number of information handling systems, external resources, and/or composed information handling systems.

Any of these data structures may be implemented using any combination and quantity of, for example, lists, tables, unstructured data, databases, etc. While illustrated in FIG. 4 as being stored locally, any of these data structures may be stored remotely and may be distributed across any number of devices without departing from the invention.

While the storage (410) has been illustrated and described as including a limited number and type of data, a storage in accordance with embodiments of the invention may store additional, less, and/or different data without departing from the invention.

While the system control processor manager (50) has been illustrated and described as including a limited number of specific components, a system control processor manager in accordance with embodiments of the invention may include additional, fewer, and/or different components than those illustrated in FIG. 4 without departing from the invention.

As discussed above, the system of FIG. 1.1 may provide computer implemented services using composed information handling systems. FIG. 5 shows methods that may be performed by components of the system of FIG. 1.1 to manage composed information handling systems.

FIG. 5 shows a flowchart of a method in accordance with one or more embodiments of the invention. The method depicted in FIG. 5 may be performed to instantiate composed information handling systems in accordance with one or more embodiments of the invention. The method shown in FIG. 5 may be performed by, for example, a system control processor manager (e.g., 50, FIG. 1.1). Other components of the system in FIG. 1.1 may perform all, or a portion, of the method of FIG. 5 without departing from the invention.

While FIG. 5 is illustrated as a series of steps, any of the steps may be omitted, performed in a different order, additional steps may be included, and/or any or all of the steps may be performed in a parallel and/or partially overlapping manner without departing from the invention.

In step 500, a composition request is obtained. The composition request may be obtained from a client or another entity. The composition request may request that a new composed information handling system be instantiated or that the quantity of resources allocated to an existing composed information handling system be modified. The requests may be explicit, or intent based.

In step 502, resources to service the composition request are allocated. To allocate the resources, the resources may be identified using a telemetry data map (412, FIG. 4) to identify various resource sets having resources necessary to satisfy the composition request or existing resources already allocated to the composed information handling system that can be deallocated (e.g., depending on the type of request).

For new composition requests, at least one compute resource set, one control resource set, and one hardware resource set may be identified. Once identified, instructions for presenting the hardware resource set to the compute resource set may be sent to the system control processor. In accordance with the instructions, the system control processor may begin management of the hardware resources. The management may include, for example, setting up virtualization, emulation, data protection, encryption, and/or other types of management services for the hardware devices of the hardware resource set. The control resource set may present, as bare metal resources, the managed hardware resource set. After presentation, the compute resource set may discover the bare metal resource and begin to utilize them to provide desired computer implemented services.

For recomposition requests (e.g., additions/removals to/from existing composed information handling systems), at least one of any type of resource set may be identified to satisfy the request. The identified resource set may be added or removed from the composed information handling system to satisfy the request.

The control resource set may also appropriately update its managed data structures reflecting the newly composed information handling system.

In step 504, a managed devices controller is notified (e.g., by sending a hardware device activity level modification notification) of one or more hardware devices of an information handling system which have modified activity levels based on the allocated resources. For example, the system control processor manager may send a listing of each hardware device of the information handling system hosting the managed devices controller that was allocated to or deallocated from the composed information handling system in step 502. Consequently, the managed devices controller may be notified of hardware devices of the information handling system that are likely to have changed activity levels and/or the magnitude of the likely change in activity level.

The method may end following step 504.

Using the method illustrated in FIG. 504, composition requests may be serviced in a manner that enables the information handling systems to continue to accurately ascertain their power envelope even when its resource allocations are modified. To do so, the system may notify information handling systems of changed activity levels of hardware devices.

Turning to FIGS. 6.1-6.2, these figures illustrate methods that may be performed by a system control processor to manage the operation of a host information handling system.

FIG. 6.1 shows a flowchart of a method in accordance with one or more embodiments of the invention. The method depicted in FIG. 6.1 may be performed to instantiate composed information handling systems in accordance with one or more embodiments of the invention. The method shown in FIG. 6.1 may be performed by, for example, a system control processor (e.g., 298, FIG. 3). Other components of the system in FIG. 1.1 may perform all, or a portion, of the method of FIG. 6.1 without departing from the invention.

While FIG. 6.1 is illustrated as a series of steps, any of the steps may be omitted, performed in a different order, additional steps may be included, and/or any or all of the steps may be performed in a parallel and/or partially overlapping manner without departing from the invention.

In step 600, a hardware device activity level modification notification is obtained. The hardware device activity level modification notification may be obtained from a system control processor. The hardware device activity level modification notification may specify a change in activity level of one or more hardware devices of an information handling system that hosts the system control processor that obtained the hardware device activity level modification notification.

For example, the hardware device activity level modification notification may be a data structure including a list of hardware devices of the information handling system and corresponding activity levels for those hardware devices.

In step 602, a hardware device activity map is updated based on the hardware device activity level modification notification. For example, the hardware device activity map may be updated to match the hardware device activity level modification notification.

The method may end following step 602.

Using the method illustrated in FIG. 6.1, an information handling system may maintain an up to date listing of its hardware devices and likely activity levels of those devices.

Turning to FIG. 6.2, FIG. 6.2 shows a flowchart of a method in accordance with one or more embodiments of the invention. The method depicted in FIG. 6.2 may be performed to manage the operation of a composed information handling system in accordance with one or more embodiments of the invention. The method shown in FIG. 6.2 may be performed by, for example, a system control processor (e.g., 298, FIG. 3). Other components of the system in FIG. 1.1 may perform all, or a portion, of the method of FIG. 6.2 without departing from the invention.

While FIG. 6.2 is illustrated as a series of steps, any of the steps may be omitted, performed in a different order, additional steps may be included, and/or any or all of the steps may be performed in a parallel and/or partially overlapping manner without departing from the invention.

In step 610, a restart of a composed information handling system is identified. The restart may be identified by the system control processor via any method (e.g., bus notification, button sensing, etc.).

In step 612, the hardware devices of the composed information handling system are inventoried during the restart. For example, a processor of the composed information handling system may identify the presentation, by a system control processor, of bare metal resources corresponding to any type and quantity of hardware devices. The presented hardware devices may be identified as part of the inventory of the composed information handling system.

In step 614, the power envelope for an information handling system hosting the system control processor of the composed information handling system is calculated based on a hardware device activity map. As noted above, the hardware device activity map may specify each hardware device of the information handling system that is allocated to any composed information handling system. Consequently, the list of hardware devices in the hardware device activity map may be different from those listed in the hardware devices inventory of the composed information handling system.

For example, the inventory of the hardware devices of the composed information handing system may list devices of other information handling systems. Consequently, the hardware device activity map may include a subset of the hardware devices specified in the inventory in addition to hardware devices of the information handling system that are allocated to other composed information handling systems.

The power envelope may be calculated via any method without departing from the invention. For example, the power envelope may be calculated by aggregating the maximum power load of each of the hardware devices listed in the hardware device activity map. Other statistics may be used to quantify the power envelope without departing from the invention.

In step 616, it is determined whether the power envelope exceeds the power capacity of the managed devices. As discussed above, the managed devices may manage the operation of the information handling system by, for example, supplying power, removing heat, etc. However, the managed devices may only have a finite capacity for providing these services (i.e., their power capacity).

If it is determined that the power envelope exceeds the power capacity of the managed devices, then the method may proceed to step 620. Otherwise, the method may proceed to step 618.

Steps 612-616 may be performed while a composed information handling system is restarting. Step 618 may be performed after the composed information handling system has restarted.

In step 618, computer implemented services are provided using the hardware devices while operating the managed devices based on the power envelope. Because the power envelope was determined based only on the hardware devices that are both likely to be active and hosted by the information handling system, the power envelope may only reflect the likely power consumption of the information handling system (as opposed to the composed information handling system). Consequently, operation set points of the managed device may be set proportionately to address the needs of the hardware devices of the information handling system.

In one or more embodiments of the invention, operating the managed devices comprises setting an operating point of a fan. The operating point may be set by, for example, setting a pulse width modulation duty cycle of power being supplied to the fan. The operating point may be set using other modalities without departing from the invention.

Operating the managed devices may include setting the operating points of any number and quantity of devices that facilitate operation of the information handling system. These devices may include, for example, fans (or other types of thermal management devices), power supplies, displays, and/or other types of devices that provide management services (e.g., thermal, power, etc.) to hardware devices.

Providing the computer implemented services may include utilizing the computing resources provided by any number of hardware devices distributed across any number of information handling systems and/or external devices that have been allocated to the composed information handling system.

The method may end following step 618.

Returning to step 616, the method may proceed to step 620 if it is determined that the power envelope exceeds the managed devices power capacity.

In step 620, the composed information handling system enters an error state. The error state may pause the restart of the composed information handling system. During the error state, the system control processor may notify any number of entities via any method of the error state. For example, error messages may be displayed via screens, electronic communications may be sent to administrators, etc. The restart of the composed information handling system may not be allowed to be completed following step 620 until an administrator or other person interacts with the composed information handling system.

The method may end following step 620.

Using the method illustrated in FIG. 6.2, an information handling system may provide computer implemented services while ensuring that its managed devices operate in accordance with its power envelope.

Figure 7:
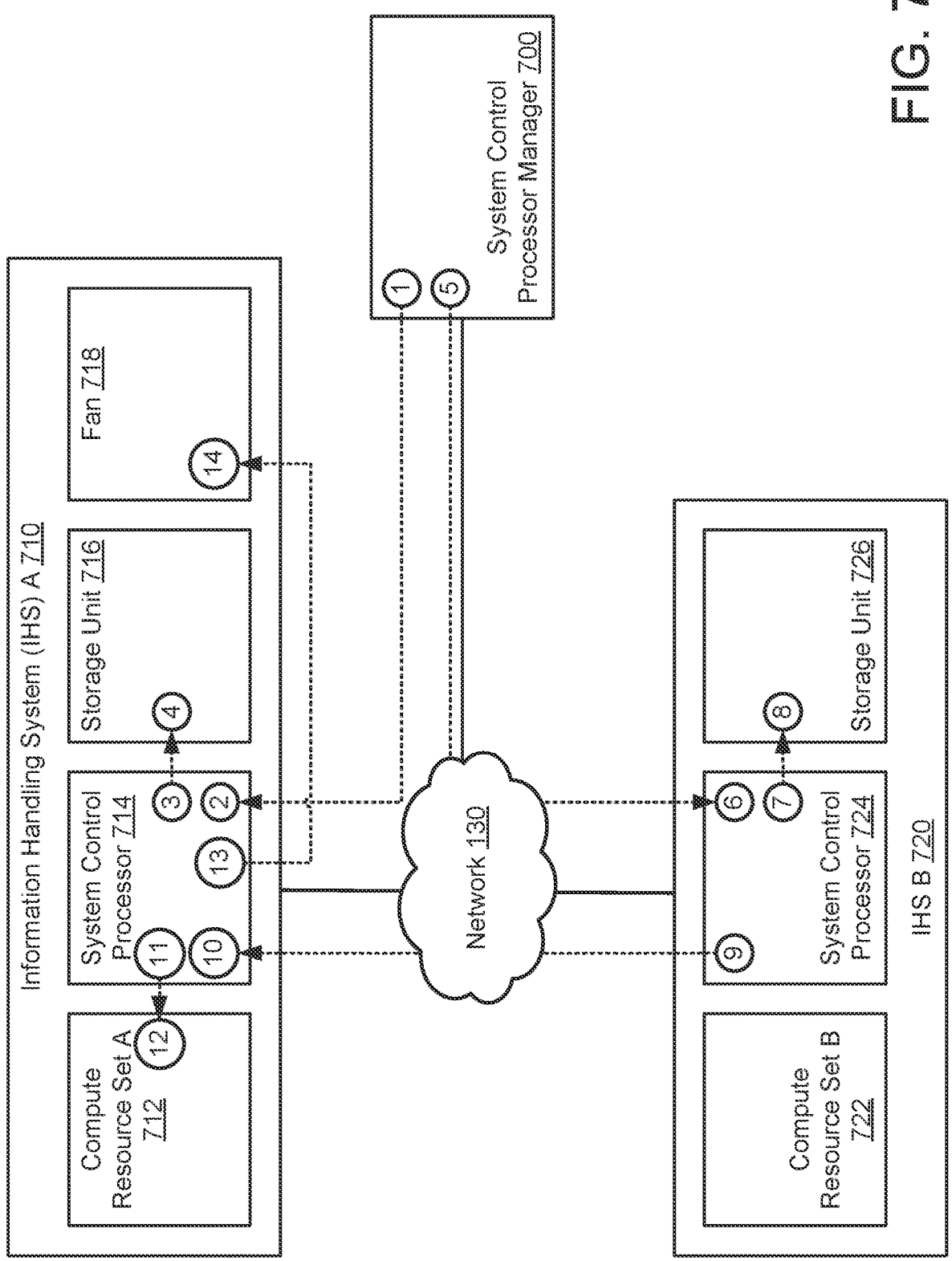
FIG. 7 shows a diagram of the operation of an example system over time in accordance with one or more embodiments of the invention.

To further clarify embodiments of the invention, a non-limiting example is provided in FIG. 7. FIG. 7 is a system similar to that illustrated in FIG. 1.1. Actions performed by components of the system are illustrated by numbered, circular boxes interconnected, in part, using dashed lines terminating in arrows. For the sake of brevity, only a limited number of components of the system of FIG. 1.1 is illustrated in FIG. 7.

EXAMPLE

Consider a scenario as illustrated in FIG. 7 in which a system control processor manager (700) is instantiating a composed information handling system using two information handling systems (710, 720). To instantiate the composed information handling system, the system control processor manager (700), at step 1, decides that compute resource set A (712), storage unit (716), and storage unit (726) should be allocated to the composed information handling system.

At step 2, the system control processor manager (700) generates and sends a composition request to the system control processor (714) of the information handling system A (710). Additionally, the system control processor manager (700) notifies the system control processor (714) that the compute resource set A (712) and storage unit (716) will be active (but does not indicate that storage unit (726) will be active).

In response, at step 3, the system control processor (714) sets up management services for the storage unit (716). At step 4, the system control processor (714) allocates the managed storage resources of the storage unit (716) to the composed information handling system and updates corresponding managed data structures to reflect this allocation.

At step 5, the system control processor manager (700) generates and sends a second composition request to the system control processor (724) of the information handling system B (720). In response, at step 6, the system control processor (724) identifies that it will work with the system control processor (714) to allocate the storage resources of the storage unit (726) to the composed information handling system (e.g., without allocating the compute resource set B (722)).

At step 7, the system control processor (724) sets up management services for the storage unit (726). At step 8, the system control processor (724) allocates the storage resources of the storage unit (726) to the composed information handling system and updates corresponding managed data structures to reflect this allocation.

At step 9, the system control processor (724) establishes a connection with the system control processor (714) via network (130). Once setup, the system control processor (724) notifies, at step 10, the system control processor (714) of the allocated storage resources of the storage unit (726).

In step 11, the system control processor (714) updates its maintained data structures based on the storage resources provided by storage unit (726). At step 12, the system control processor (714) presents, as bare metal resources, the storage resources from both the storage unit (716) and storage unit (726). Subsequently, the compute resource set A (712) discovers the resources and begins to use them as bare metal resources.

At step 13, the system control processor (714) calculates a power envelope based on the activity of the compute resource set A (712) and storage unit (716) even though it is part of a composed information handling system that also includes storage unit (726) (but does not take into account the activity of storage unit (726) when calculating the power envelope). Consequently, at step 14, when the system control processor (714) sets the operating point of a fan (718), the set point is only based on the power envelope of the compute resource set A (712), system control processor (714), and storage unit (716).

End of Example

Thus, as illustrated in FIG. 7, embodiments of the invention may provide for the calculation of power envelopes of information handling systems that support composed information handling systems.

Figure 8:
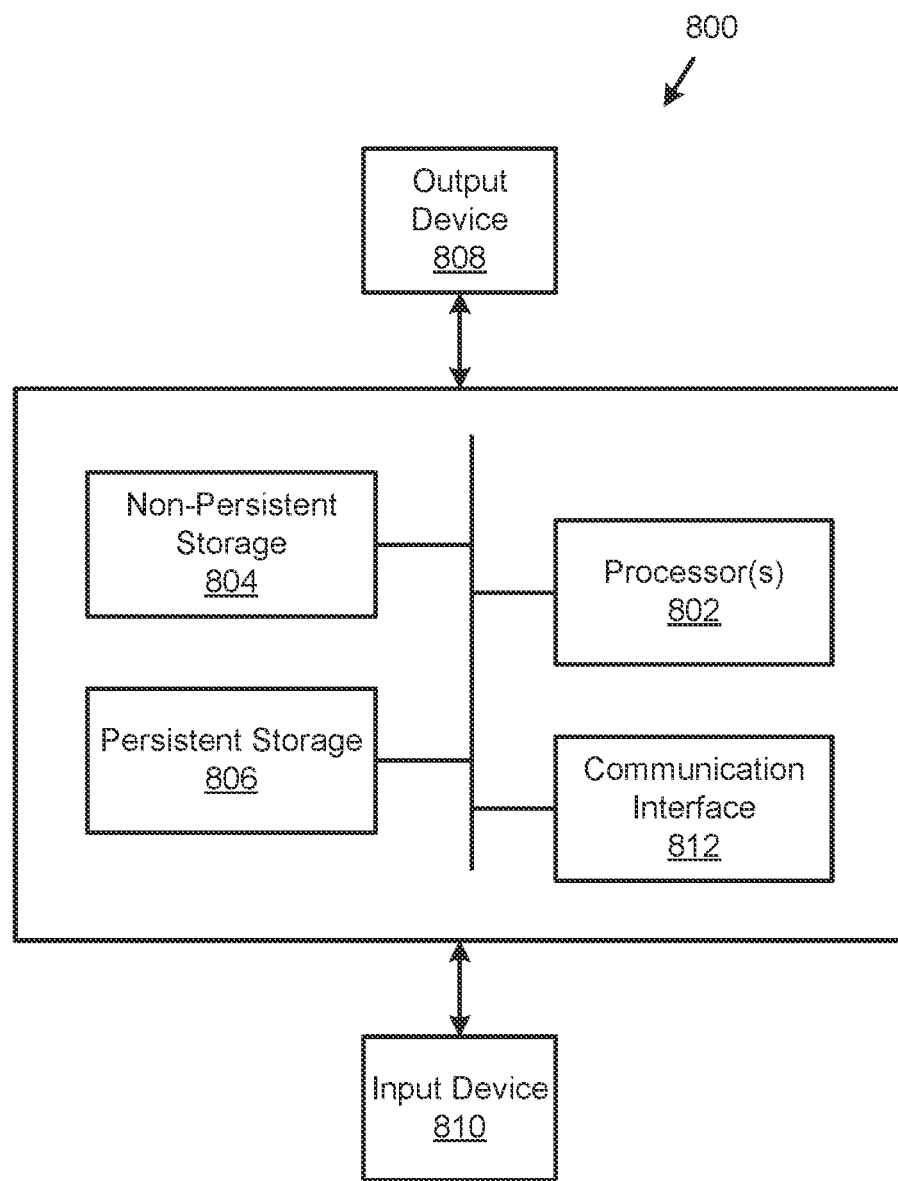
FIG. 8 shows a diagram of a computing device in accordance with one or more embodiments of the invention.

As discussed above, embodiments of the invention may be implemented using computing devices. FIG. 8 shows a diagram of a computing device in accordance with one or more embodiments of the invention. The computing device (800) may include one or more computer processors (802), non-persistent storage (804) (e.g., volatile memory, such as random access memory (RAM), cache memory), persistent storage (806) (e.g., a hard disk, an optical drive such as a compact disk (CD) drive or digital versatile disk (DVD) drive, a flash memory, etc.), a communication interface (812) (e.g., Bluetooth interface, infrared interface, network interface, optical interface, etc.), input devices (810), output devices (808), and numerous other elements (not shown) and functionalities. Each of these components is described below.

In one embodiment of the invention, the computer processor(s) (802) may be an integrated circuit for processing instructions. For example, the computer processor(s) may be one or more cores or micro-cores of a processor. The computing device (800) may also include one or more input devices (810), such as a touchscreen, keyboard, mouse, microphone, touchpad, electronic pen, or any other type of input device. Further, the communication interface (812) may include an integrated circuit for connecting the computing device (800) to a network (not shown) (e.g., a local area network (LAN), a wide area network (WAN) such as the Internet, mobile network, or any other type of network) and/or to another device, such as another computing device.

In one embodiment of the invention, the computing device (800) may include one or more output devices (808), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (802), non-persistent storage (804), and persistent storage (806). Many different types of computing devices exist, and the aforementioned input and output device(s) may take other forms.

Embodiments of the invention may provide a system and method for providing computer implemented services using information handling devices. Specifically, embodiments of the invention may provide for the accurate calculation of power envelopes of information handling systems that support composed systems. By doing so, the operating points of managed devices that support the operation of the information handling systems may be more likely to be commensurate with the needs of the hardware devices of the information handling systems.

Thus, embodiments of the invention may address the problem of resource allocation in a distributed system. For example, by improving the accuracy of power envelope calculation, the quantity of power used for providing cooling services, power services, and/or other services may be better tailored to the needs of the system. Consequently, wasteful overprovision of such services may be avoided thereby reducing the cost of operating systems.

The problems discussed above should be understood as being examples of problems solved by embodiments of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention. Accordingly, the scope of the invention should be limited only by the attached claims.

What is claimed is:

1. An information handling system for composing composed information handling systems, comprising:
   managed devices; and
   a system control processor, of a composed information handling system of the composed information handling systems, programmed to:
   during a restart of the composed information handling system:
      obtain an inventory of all hardware devices utilized by the composed information handling system,
      calculate, based on a subset of the hardware devices specified by the inventory, a power envelope for the information handling system,
      make a determination that the power envelope does not exceed a power capacity of the managed devices; and
   based on the determination and following the restart, provide computer implemented services using the hardware devices while operating the managed devices based on the power envelope,
   wherein the subset of the hardware devices comprises at least one additional hardware device hosted by the information handling system that is not utilized by the composed information handling system and the at least one additional hardware device utilizes power from the power envelope for the information handling system.

2. The information handling system of claim 1, wherein the subset of the hardware devices comprises each hardware device of the hardware devices utilized by the composed information handling system that is hosted by the information handling system.

3. The information handling system of claim 1, wherein the subset of the hardware devices does not comprise any of the hardware devices utilized by the composed information handling system that are not hosted by the information handling system.

4. The information handling system of claim 1, further comprising:
   storage for storing:
      a hardware device activity map that specifies all of the hardware devices hosted by the information handling system that are utilized by any of the composed information handling systems; and
      the inventory of the hardware devices that are utilized by the composed information handling system.

5. The information handling system of claim 4, wherein the inventory of the hardware devices specifies at least one additional hardware device that is not hosted by the information handling system.

6. The information handling system of claim 5, wherein the at least one additional hardware device is hosted by a second information handling system.

7. The information handling system of claim 6, wherein the managed devices provide power management services to the subset of the hardware devices, wherein the managed devices do not provide power management services to the at least one additional hardware device.

8. The information handling system of claim 1, wherein the system control processor is further programmed to:
   prior to the restart of the composed information handling system:
      obtain a composition request for the composed information handling system;
      allocate the hardware devices specified by the inventory based on the composition request to instantiate the composed information handling system;
      obtain a listing of a portion of the hardware devices specified by the inventory that are hosted by the information handling system; and
      update a hardware device activity map based on the portion of the hardware devices.

9. The information handling system of claim 8, wherein the hardware device activity map specifies all hardware devices of the information handling system that are:
   hosted by the information handling system; and
   utilized by any of the composed information handling systems.

10. The information handling system of claim 9, wherein the composed information handling system comprises a compute resource set, a hardware resource set, and a control resource set comprising the system control processor.

11. The information handling system of claim 10, wherein the control resource set presents abstracted computing resources of the hardware resource set as bare metal resources to the compute resource set.

12. The information handling system of claim 1, wherein operating the managed devices comprises setting an operating point of a fan based on the power envelope.

13. The information handling system of claim 1, wherein the system control processor is further programmed to enter an error state when a second determination is made that a second power envelope exceeds the power capacity of the managed devices.

14. A method for providing computer implemented services using composed information handling systems, comprising:
   during a restart of a composed information handling system of the composed information handling systems:
      obtaining an inventory of all hardware devices of an information handling system that are utilized by the composed information handling system,
      calculating, based on a subset of the hardware devices specified by the inventory, a power envelope for the information handling system,
      making a determination that the power envelope does not exceed a power capacity of managed devices that provide power management services for the information handling system; and based on the determination and following the restart, providing computer implemented services using the hardware devices while operating devices that provide power management services to the subset of the hardware devices based on the power envelope, wherein the subset of the hardware devices comprises at least one additional hardware device hosted by the information handling system that is not utilized by the composed information handling system and the at least one additional hardware device utilizes power from the power envelope for the information handling system.

15. The method of claim 14, wherein the subset of the hardware devices comprises each hardware device of the hardware devices utilized by the composed information handling system that is hosted by the information handling system.

16. The method of claim 14, further comprising:

transitioning the composed information handling system to an error state when a second determination is made that a second power envelope exceeds the power capacity of the managed devices.

17. A non-transitory computer readable medium comprising computer readable program code, which when executed by a computer processor enables the computer processor to perform a method for providing computer implemented services using composed information handling systems, the method comprising:

during a restart of a composed information handling system of the composed information handling systems:

obtaining an inventory of all hardware devices of an information handling system that are utilized by the composed information handling system, calculating, based on a subset of the hardware devices specified by the inventory, a power envelope for the information handling system, making a determination that the power envelope does not exceed a power capacity of managed devices that provide power management services for the information handling system; and based on the determination and following the restart, providing computer implemented services using the hardware devices while operating devices that provide power management services to the subset of the hardware devices based on the power envelope, wherein the subset of the hardware devices comprises at least one additional hardware device hosted by the information handling system that is not utilized by the composed information handling system and the at least one additional hardware device utilizes power from the power envelope for the information handling system.

18. The non-transitory computer readable medium of claim 17, wherein the subset of the hardware devices comprises each hardware device of the hardware devices utilized by the composed information handling system that is hosted by the information handling system.

19. The non-transitory computer readable medium of claim 17, wherein the method further comprises:

transitioning the composed information handling system to an error state when a second determination is made that a second power envelope exceeds the power capacity of the managed devices.

* * * * *